United States Patent
Marcinkowski et al.

(10) Patent No.: US 11,189,118 B2
(45) Date of Patent: Nov. 30, 2021

(54) SMART THERMOSTAT HUB

(71) Applicant: EDST, LLC, Lubbock, TX (US)

(72) Inventors: Dave Marcinkowski, Lubbock, TX (US); Thomas Mandry, Lubbock, TX (US)

(73) Assignee: EDST, LLC, Lubbock, TX (US)

( * ) Notice: Subject to any disclaimer, the term of this patent is extended or adjusted under 35 U.S.C. 154(b) by 0 days.

(21) Appl. No.: 16/912,370

(22) Filed: Jun. 25, 2020

(65) Prior Publication Data
US 2020/0327751 A1 Oct. 15, 2020

Related U.S. Application Data

(63) Continuation of application No. 16/162,262, filed on Oct. 16, 2018, now Pat. No. 10,825,273.

(51) Int. Cl.
*H04W 4/00* (2018.01)
*G07C 9/00* (2020.01)
(Continued)

(52) U.S. Cl.
CPC ....... *G07C 9/00182* (2013.01); *G06F 3/0484* (2013.01); *G07C 9/00904* (2013.01);
(Continued)

(58) Field of Classification Search
CPC ............ G07C 9/27; G07C 2009/00825; G07C 9/00182; G07C 9/00896; G07C 2009/00317; G07C 2009/00769; G07C 9/00309; G07C 9/00571; G07C 9/00904; G07C 2009/00198; G07C 2009/00333;
(Continued)

(56) References Cited

U.S. PATENT DOCUMENTS 9,478,084 B1 10/2016 Robinson
9,875,647 B1 * 1/2018 Tannenbaum ........... G07C 9/28
(Continued)

FOREIGN PATENT DOCUMENTS

EP 0533507 A1 3/1993
WO WO-2014107196 A1 7/2014

OTHER PUBLICATIONS

International Search Report and Written Opinion issued for PCT Application No. PCT/IB2019/057876, dated Dec. 10, 2019, 30 pages.

*Primary Examiner* — Dionne Pendleton
(74) *Attorney, Agent, or Firm* — Norton Rose Fulbright US LLP

(57) ABSTRACT

A smart thermostat hub and a management platform for controlling and securing smart devices in a multi-family residential property are disclosed. Smart thermostat hubs may bi-directionally communicate with the management platform using a LoRaWAN communication link and communicate with smart devices present within an apartment of the multi-family residential property via a non-LoRaWAN communication link. Smart thermostat hub may provide a gateway or bridge between the management platform and an offline door lock, thereby enabling access credentials for an offline door lock to be disabled from the management platform, and may serve to facilitate remote configuration of other smart devices, such as thermostats and smart light fixtures, for example.

20 Claims, 10 Drawing Sheets

(51) Int. Cl.
*H04W 12/04* (2021.01)
*G06F 3/0484* (2013.01)

(52) U.S. Cl.
CPC ........ *H04W 12/04* (2013.01); *G07C 9/00309* (2013.01); *G07C 2009/00198* (2013.01); *G07C 2009/00333* (2013.01); *G07C 2009/00357* (2013.01); *G07C 2009/00507* (2013.01); *G07C 2009/00769* (2013.01); *G07C 2009/00825* (2013.01)

(58) Field of Classification Search
CPC ........... G07C 2009/00357; G07C 2009/00428; G07C 2009/00507; G07C 2009/00936; G07C 9/00817; G07C 9/215; G05B 19/00; H04L 67/02; H04L 67/06; H04L 67/1023; H04L 67/104; H04L 67/12; H04L 41/046; H04L 41/0806; H04L 41/0816; H04L 47/825; H04L 51/046; H04L 51/38; H04L 63/029; H04L 63/168; H04L 63/20; H04L 67/10; H04L 67/1014; H04L 67/125; H04L 67/28; H04L 9/0866; H04L 41/0806; H04L 67/06; H04L 67/104; H04L 9/0866; H04L 67/12; H04W 4/021; H04W 4/027; H04W 4/80; H04W 4/90; H04W 12/04; H04W 4/50; H04W 84/042; H04W 84/12; H04W 4/80; H04W 4/50; H04W 4/027; G06F 1/3231; G06F 1/3287; G06F 3/0484; G06F 9/06; G06F 9/5088; G06F 9/06; G06F 9/5088; G06Q 10/02; G06Q 50/12; G06Q 50/163; G06Q 50/163

See application file for complete search history.

(56) References Cited

U.S. PATENT DOCUMENTS

| | | |
|---|---|---|
| 2016/0005247 A1 | 1/2016 | Mehl et al. |
| 2016/0124401 A1 | 5/2016 | Li |
| 2016/0239001 A1 | 8/2016 | Chin et al. |
| 2018/0110093 A1 | 4/2018 | Deros et al. |
| 2018/0234489 A1* | 8/2018 | Hammons ............... H04L 67/12 |
| 2018/0350170 A1* | 12/2018 | Wang ..................... G06F 1/3231 |
| 2019/0371096 A1* | 12/2019 | Fisher ...................... G07C 9/27 |
| 2020/0118370 A1* | 4/2020 | Marcinkowski ...... G06F 3/0484 |
| 2020/0118371 A1* | 4/2020 | Marcinkowski ... G07C 9/00896 |
| 2021/0142601 A1* | 5/2021 | Schoenfelder ..... G07C 9/00309 |

* cited by examiner

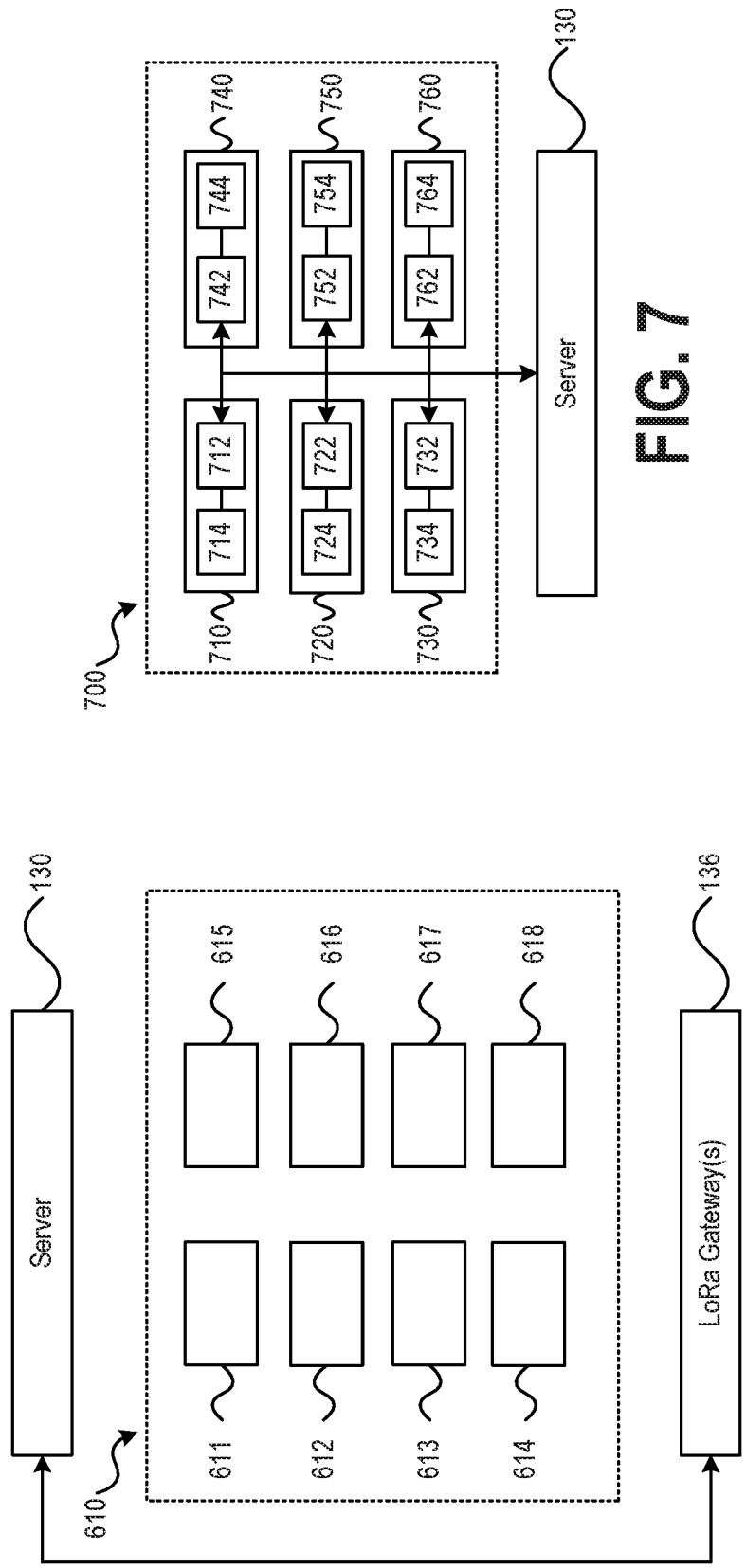

SMART THERMOSTAT HUB

CROSS-REFERENCE TO RELATED APPLICATIONS

The present application is a continuation of U.S. patent application Ser. No. 16/162,262 filed Oct. 16, 2018, entitled "SMART THERMOSTAT HUB"; the disclosures of which are incorporated by reference herein in their entirety.

TECHNICAL FIELD

The present disclosure is directed to an intelligent thermostat. In particular, the present disclosure is directed to an intelligent thermostat that can function as a hub having multi-band/multi-radio communication capabilities and can be implemented in a system for controlling and securing offline door locks and other smart devices within a multi-family property.

BACKGROUND

Technology and the benefits it provides often plays an important role with respect to how many consumers make decisions. This has become increasingly so in the real-estate industry, and more specifically in the multi-family residential property market. To illustrate, Class A multi-family residential properties (e.g., apartments, etc.) may have keyless entry systems installed that allow residents to gain entry into their respective apartments by placing a fob, smartphone, or smartcard in proximity to a door lock. As another example, these Class A multi-family residential properties may have been constructed with infrastructure, such as Wireless Fidelity (Wi-Fi) access points and/or wired networks (e.g., Ethernet), for providing Internet access to residents. While the security and convenience these technologies provide are attractive to residents, deploying such technologies in older multi-family residential properties, such as Class B and C multi-family residential properties, can be cost prohibitive and/or present challenges with respect to the security of residents of the multi-family residential property.

For example, keyless entry systems may utilize online door locks or offline door locks. Online door locks may be controlled (e.g., locked and unlocked) remotely through an Internet-accessible network connection and locally by a device (e.g., a fob, smartphone, smartcard, etc.) that is placed in proximity to a sensor of the online door lock, while offline door locks can only be controlled (e.g., locked and unlocked) by a device (e.g., a fob, smartphone, smartcard, etc.) that is placed in proximity to a sensor of the offline door lock. The cost to deploy an online door lock-based keyless entry system in a multi-family residential property can be significantly higher than offline door lock-based keyless entry systems due to the requirement that network communication infrastructure (e.g., a mesh network, a Wi-Fi network, etc.) be provided to facilitate network-based control of the door lock.

While less expensive to deploy, the offline door lock-based keyless entry systems present challenges with respect to security. For example, in addition to being controlled remotely, online door locks can be managed remotely, such as to authorize and disable new access credentials. For offline door locks, new access credentials for controlling an offline door lock may be created via a network-based application (e.g., a cloud-based application or website); however, offline door locks require an individual, such as a property manager or property maintenance personnel, to connect (e.g., via a universal serial bus (USB) connection) an external device (e.g., a laptop, tablet, or other electronic device) to the offline door lock and then use software or another utility provided by the external device to disable access credentials. The requirement that access credentials for offline door locks be disabled in person presents risks with respect to the security of residents of a multi-family residential property. For example, if a resident's access credential (e.g., fob, smartcard, etc.) is lost or stolen, the access device may be used to gain entry into the resident's apartment before the appropriate personnel can visit the resident's apartment and use an external device to disable the lost or stolen access credential. As another example, if a resident gives an access credential to a non-resident and then has a falling out with the non-resident, the resident cannot prevent the non-resident from using access credential to gain entry into the resident's apartment and must wait until the appropriate personnel can visit the resident's apartment to disable the access credential provided to the non-resident.

SUMMARY

Embodiments described herein provide a system that comprises smart thermostat hubs and a management platform for controlling and securing smart devices in a multi-family residential property. Smart thermostat hubs may comprise a first communication interface that facilitates bi-directional communication between smart thermostat hub and the management platform and a second communication interface that facilitates bi-directional communication between the thermostat smart hub and the smart devices present within a unit of the multi-family residential property. Smart thermostat hub may provide a gateway or bridge between the management platform and an offline door lock, thereby enabling access credentials for an offline door lock to be disabled from the management platform via the bi-directional communication links provided by the first and second communication interfaces of smart thermostat hub.

In addition to providing enhanced the security for offline door lock-based keyless entry systems, smart thermostat hub may also provide functionality for automating and improving various property management tasks. For example, the management platform may be configured to automatically detect (e.g., based on a database) when a unit of a multi-family residential property becomes vacant and may transmit control information to smart thermostat hub of the vacant unit. The control information may include information that identifies various smart devices within the unit, as well as parameters for configuring the identified smart devices. Upon receiving the control information via first communication interface, smart thermostat hub may transmit commands to each of the identified smart devices via second communication interface, where the commands configure the identified smart devices in accordance with parameters specified in the control information. Similar operations may be performed when the management platform detects that a resident is scheduled to move in to a vacant unit of the multi-family residential property.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed methods and apparatuses, reference should be made to the embodiments illustrated in greater detail in the accompanying drawings, wherein:

FIG. 6 is a block diagram illustrating additional aspects of an intelligent property management system configured in accordance with embodiments of the present disclosure;

FIG. 7 is a block diagram illustrating additional aspects of an intelligent property management system configured in accordance with embodiments of the present disclosure;

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

Figure 1:
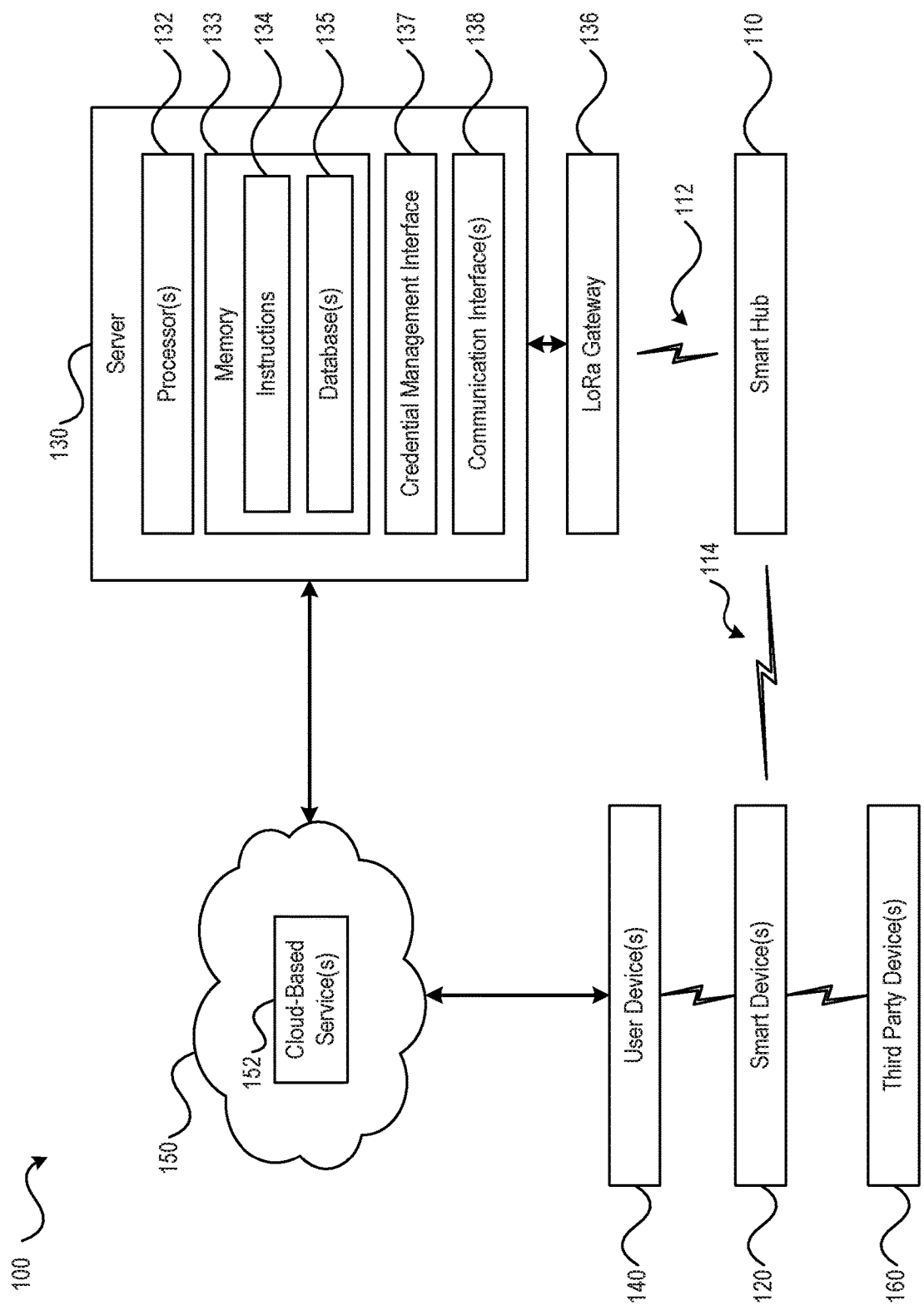
FIG. 1 is a block diagram of an exemplary system for managing and securing access credentials for accessing a multi-family residential property using smart devices in accordance with aspects of the present disclosure.

Referring to FIG. 1, a block diagram of an exemplary system for managing and securing access credentials for accessing a multi-family residential property using smart devices in accordance with aspects of the present disclosure is shown as a system 100. As described in more detail below, system 100 provides functionality that improves the manner in which access to multi-family residential properties is managed and secured. Additionally, system 100 may reduce the cost of deploying various technologies in a multi-family residential property, thereby enabling such technologies to be utilized in certain multi-family residential properties for which previous technologies were deemed cost prohibitive, such as Class B and Class C properties.

In FIG. 1, system 100 is illustrated as comprising smart hub 110, one or more smart devices 120, and server 130. As shown in FIG. 1, server 130 may include one or more processors 132, memory 133, credential management module 137, and one or more communication interfaces 138. Memory 133 may include random access memory (RAM), read only memory (ROM), hard disk drives(s) (HDDs), solid state drive(s) (SSDs), network attached storage (NAS) devices, or other types of memory devices for storing data in a persistent or non-persistent state. Memory 133 may store instructions 134 that, when executed by the one or more processors 132, cause the one or more processors 132 to perform the operations of server 130 described with reference to FIGS. 1-6. Additionally, one or more databases 135 may be stored at memory 133. Exemplary types of information that may be stored at the one or more databases 135 are described in more detail below. It is noted that although FIG. 1 illustrates server 130 as a standalone device, it is to be understood that server 130 and the functionality described herein with respect to the server 130, may be implemented using more than one server or via a collection of computing resources (e.g., processors, memory, communication interfaces, and the like) deployed in the cloud.

Credential management interface 137 may be configured to manage (e.g., create and disable) access credentials provided to residents of a multi-family residential property. For example, credential management interface 137 may be configured to generate access credentials that enable a resident to access one or more areas of a multi-family residential property, such as the resident's apartment, a workout facility, a pool, a parking garage, and the like. Access credentials may be stored on a device, such as a fob, a smartcard, or a resident's smartphone and may be used to control (e.g., lock and unlock) an offline door lock installed on a door of the resident's apartment. In an embodiment, each of the offline door locks of the multi-family residential property may comprise logic configured to process access credentials presented for authentication. For example, when a resident places a device having the resident's access credential in proximity to a sensor (e.g., a near field communication (NFC) device, a Bluetooth device, etc.) of the offline door lock, access credential may be received by the logic for processing, which may include applying a hash function or other data processing technique. If the processing is successful (e.g., a result of the hash function or other processing technique satisfies a criterion), a lock control mechanism may be engaged, thereby enabling the resident to turn a knob that controls a deadbolt or other form of locking device to either lock or unlock the offline door lock. If the processing is not successful (e.g., the result of the hash function or other processing technique does not satisfy the criterion), the lock control mechanism may not be engaged. When the lock control mechanism is not engaged, the knob that controls the deadbolt may spin freely (or not move at all), thereby preventing the deadbolt from being placed in a locked state or an unlocked state. Additional features provided by an offline door lock in accordance with embodiments are described in more detail below with respect to FIG. 12.

In an embodiment, rather than generating access credentials, the credential management interface 137 may interface with a system of a third party service provider that is configured to generate access credentials. In such an embodiment, the credential management interface 137 may enable property management personnel and/or a resident to request an additional access credential that may be utilized to unlock an offline door lock be generated by the system of the third party service provider. As a result of the request, the system of the third party service provider may generate the requested access credential (assuming appropriate authentication of the request and/or requestor has been performed). Where the access credential is to be utilized by a user device, such as a smart phone, the system of the third party may provide the newly generated access credential to the user device directly, such as by downloading the access credential to the user device via an access credential management application installed on the user device, or indirectly, such via a message (e.g., a text message, e-mail message, etc.) provided to the user device that includes information that enables the user device to retrieve or otherwise obtain or download the newly generated access credential, or via another technique. In an embodiment, if an access credential that is to be disabled corresponds to an access credential that was generated by the system of the third party and that is stored on a user device, such as a smart phone, the server 130 may be configured to interact with the system of the third party to disable such access credentials, such as by providing information the user device to disable further use of the access credential. If, however, the access credential is stored on a third party device 160, such as a fob or smartcard, disabling of the access credential may be accomplished via communication of control information to smart hub 110, as described in more detail below.

In an embodiment, one or more databases 135 may include a credential database storing information associated with the offline door locks installed at the multi-family residential property. When an access credential for a particular offline door lock is to be generated, credential management module 137 may access the credential database to obtain information associated with the particular offline door lock, and then use the obtained information to create access credential. For example, the information stored in access credential database 135 may comprise information that may be used to generate access credentials that, when processed by the logic of the designated offline door lock, produce a successful result. Additionally, when new access credentials are generated, access credential management module 137 may update one or more records stored at the credential database (or another database), such as to record information that identifies the resident or individual access credential was provided to.

The one or more communication interfaces 138 may include a first communication interface configured to communicatively couple server 130 to smart hubs deployed within the multi-family residential property, such as smart hub 110, and may include a second communication interface configured to communicatively couple server 130 to one or more communication networks. First communication interface of server 130 may be configured to communicate with smart hub 110 via Long Range (LoRa) wide area network (LoRaWAN) communication link 112 and second communication interface of server 130 may be configured to communicate with the one or more communication networks via a non-LoRaWAN communication link, such as a Institute of Electrical and Electronics Engineers (IEEE) 802.11 communication link, an Ethernet communication link, and the like. In an embodiment, the first communication interface may communicatively couple the server 130 to a LoRa gateway 136, as shown in FIG. 1. The LoRa gateway 136 may be configured to relay information received from the server 130 to one or more smart hubs using the LoRaWAN communication link 112 and to relay information received from one or more smart hubs via the LoRaWAN communication link 112 to the server 130. It is noted that although communication link 112 may be described herein as a LoRaWAN communication link or LoRa-based communication link, it should be understood that communication link 112 may be a communication link within a low-power, wide area network (LPWAN) or another type of network topology utilizing low power- or LoRa-based communication links. For example, in an embodiment, communication link 112 may utilize narrowband-Internet of Things (NB-IoT) communication links, Sigfox-based communication links, Weightless communication links, and the like.

Smart hub 110 may include a first communication interface and one or more additional communication interfaces. First communication interface may communicatively couple smart hub 110 to server 130 via LoRaWAN communication link 112 and one or more additional communication interfaces may communicatively couple smart hub 110 to one or more smart devices 120 via non-LoRaWAN communication links 114, such as a Wi-Fi communication link, a ZigBee communication link, a Bluetooth communication link (e.g., a Bluetooth low energy (BLE) communication link), and the like. As described in more detail below, smart hub 110 may be deployed within an area of a multi-family residential property, such as an apartment, a gym, a game room, etc. and may be utilized to facilitate remote access to, and control of, smart devices in proximity to smart hub 110.

Figure 2:
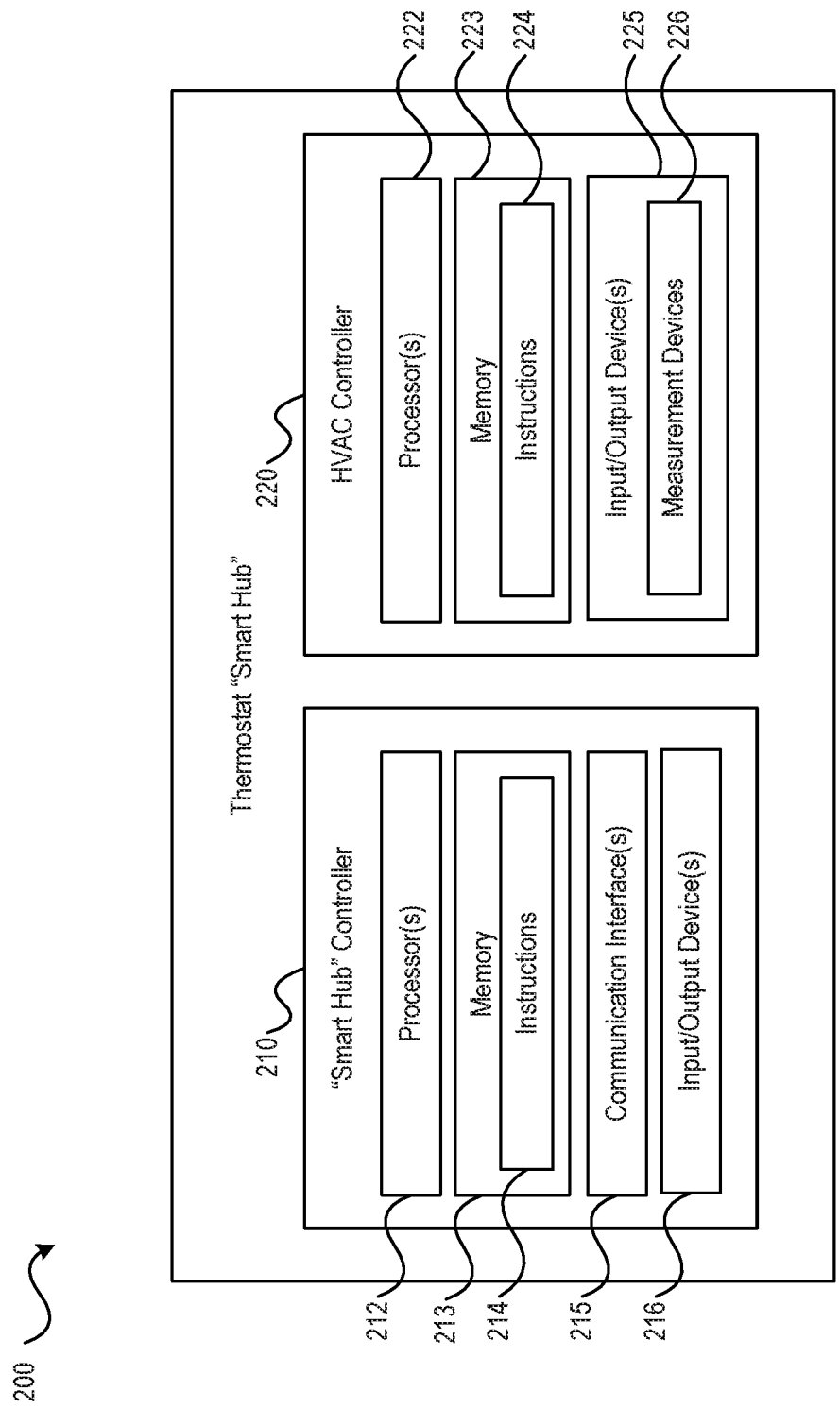
FIG. 2 is a block diagram of a smart thermostat hub in accordance with embodiments of the present disclosure.

In an embodiment, smart hub 110 may be a smart thermostat hub. For example, in FIG. 2, a block diagram of a smart thermostat hub in accordance with embodiments of the present disclosure is shown as a smart thermostat hub 200. As shown in FIG. 2, smart thermostat hub 200 includes a smart hub controller 210 and a heating, ventilation, and air conditioning (HVAC) controller 220. Smart hub controller 210 may include one or more processors 212, a memory 213, communication interfaces 215, and one or more input/output (I/O) devices 216. Memory 213 may include RAM, ROM, one or more HDDs, one or more SSDs, or other types of memory devices for storing data in a persistent or non-persistent state. Memory 213 may store instructions 214 that, when executed by the one or more processors 212, cause the one or more processors 212 to perform operations of smart hub devices described with reference to FIGS. 1-6. As explained with reference to smart hub 110 of FIG. 1, communication interfaces 215 may include a first communication interface configured to communicatively couple smart hub controller 210 to a remote server (e.g., server 130 of FIG. 1) via a LoRaWAN communication link (e.g., LoRaWAN communication link 112 of FIG. 1) and one or more additional communication interfaces configured to communicatively couple smart hub controller 210 to one or more smart devices (e.g., the one or more smart devices 120 of FIG. 1) via non-LoRaWAN communication links (e.g., non-LoRaWAN communication links 114 of FIG. 1), such as Wi-Fi communication links, ZigBee communication links, a Bluetooth communication links, and the like.

The one or more I/O devices 216 may be configured to facilitate user interaction with smart hub controller 210. For example, a user (e.g., employee, contractor, or agent of the multi-family residential property) may periodically couple an external device (e.g., third party devices 160 of FIG. 1) to smart hub controller 210 to perform software upgrades, diagnostics, etc. It is noted, however, that the communication link between smart hub controller and server may be utilized for these purposes in some embodiments. The one or more I/O devices 216 may include a USB interface, a serial port interface, or other type of wired or wireless interface suitable for exchanging information with, obtaining information from, or providing information to smart hub control 210. Additionally, I/O devices 216 may include a display device, which may provide information regarding an operational status of smart hub controller 210. For example, the display device may present information associated with a status of various communication links between smart hub controller 210 and smart devices and/or the remote server. It is noted that the specific I/O devices described above have been provided for purposes of illustration, rather than by way of limitation and that I/O devices 216 may include other types of I/O devices that facilitate interaction with smart hub controller 210.

As shown in FIG. 2, HVAC controller 220 may include one or more processors 222, a memory 223, and one or more I/O devices 225. Memory 223 may include RAM, ROM, one or more HDDs, one or more SSDs, or other types of memory devices for storing data in a persistent or non-persistent state. Memory 223 may store instructions 224 that, when executed by the one or more processors 222, cause the one or more processors 222 to perform operations for modifying an ambient setting of an environment, such as heating or cooling an apartment of a multi-family residential property to a desired temperature. One or more I/O devices 225 may include buttons, display devices, a touch screen, speakers, microphones, and/or other devices that facilitate interaction with HVAC controller 220. For example, a user may interact with the one or more I/O devices 225 to adjust a temperature of the thermostat. In response to such interaction, HVAC controller 220 may initiate operations to heat or cool an ambient environment specified by the user interaction. As shown in FIG. 2, one or more I/O devices 225 may also include measurement devices 226, such as a temperature sensor, which may be used to determine whether the temperature of the ambient environment is within a threshold tolerance (e.g., 0.5 degree, 1 degree, 2 degrees, etc.) of the target temperature specified by the user interaction.

Figure 3:
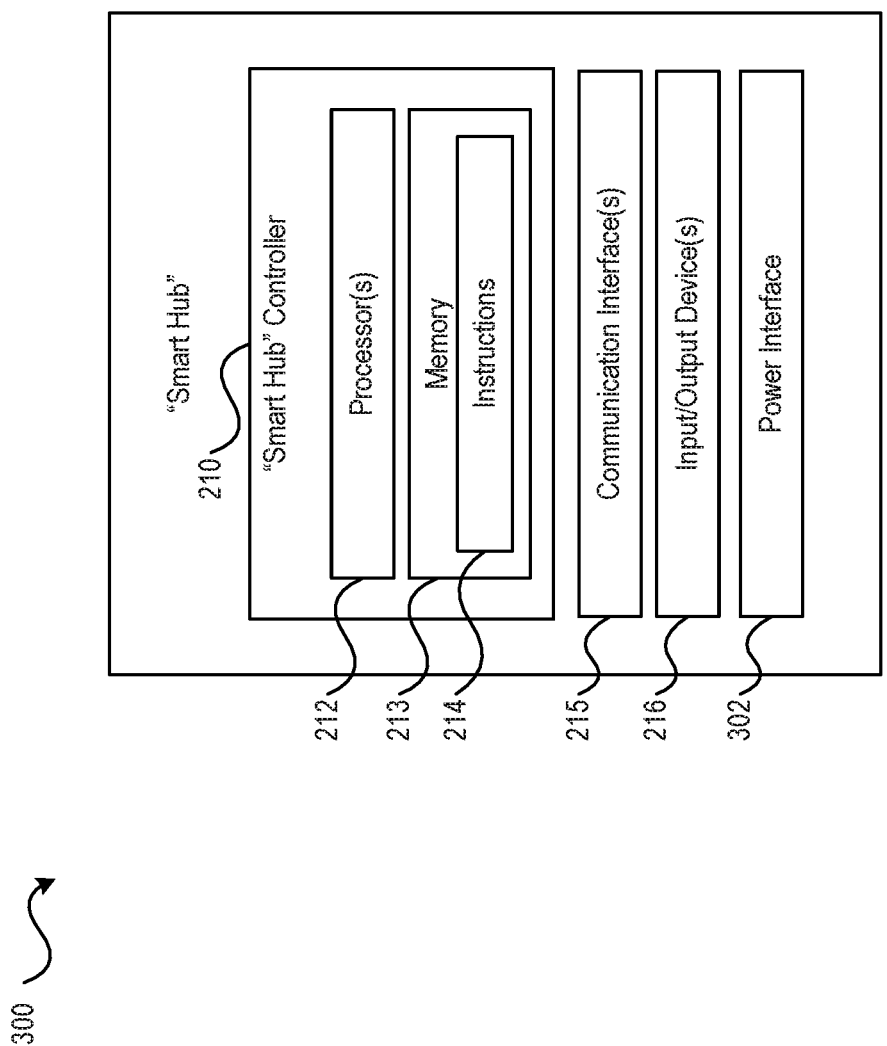
FIG. 3 is a block diagram of another smart hub in accordance with embodiments of the present disclosure.

Referring to FIG. 3, a block diagram of another smart hub in accordance with embodiments of the present disclosure is shown as a smart hub 300. As shown in FIG. 3, smart hub 300 includes smart hub controller 210, one or more processors 212, memory 213, instructions 214, communication interfaces 215, and I/O devices 216 described above with reference to FIG. 2. However, smart hub 300 of FIG. 3 also includes power interface 302. Power interface 302 may comprise one or more components (e.g., a plug configured to interface with a power outlet, a power coupling configured to couple smart hub 300 to a power source via electrical wiring of a structure, a battery interface, and the like) configured to provide operational power to smart hub 300. Therefore, as compared to smart thermostat hub 200 of FIG. 2, smart hub 300 of FIG. 3 illustrates an embodiment of smart hub as standalone device.

It is noted that, as compared to smart hub 300 of FIG. 3, smart thermostat hub 200 of FIG. 2 may provide several advantages for multi-family residential properties, such as Class B and C properties in particular. For example, a common problem when deploying new technologies in Class B and C properties is the lack of necessary infrastructure needed to support the new technology. To install the standalone smart hub illustrated in FIG. 3, an electrician would need to find or create a suitable source for tapping into existing electrical wiring of an apartment in order to hard wire smart hub 300 into the apartment's electrical power infrastructure. This may include hardwiring smart hub 300 to electrical wiring of a power outlet, which would result in loss of an existing power outlet of the apartment. Alternatively, an electrician may install smart hub 300 on a wall of the apartment by tapping into or splicing the existing electrical wiring of the apartment, but this option would create a significant cost if performed for many apartments of a multi-family residential property. An additional option would be to plug smart hub 300 into an electrical outlet of the apartment. This option may be problematic as the resident could easily unplug smart hub 300 from the electrical outlet, thereby preventing operation of smart hub 300 and the various features it provides with respect to certain smart devices of the apartment, such as managing and controlling an offline door lock and enhanced property management functionalities (e.g., controlling a thermostat, light fixtures, etc.).

In contrast, smart thermostat hub 200 of FIG. 2 is designed to be installed as a replacement to existing thermostats that may be present in a multi-family residential property. Even for Class B and Class C residential properties, the existing thermostats would be coupled to existing electrical wiring of the structure thereby enabling installation of smart thermostat hub 200 by simply removing the existing thermostat and coupling smart thermostat hub 200 to the existing electrical wiring. Such an installation can be performed with minimal effort and cost, thereby significantly reducing the cost to deploy smart thermostat hubs in a multi-family residential property. Additionally, because smart thermostat hub 200 may be enclosed within a single housing, the likelihood that a resident would tamper with or remove smart thermostat hub 200, and thereby inhibit the benefits that smart thermostat hub 200 provides with respect to security and property management functionality would be minimized. A further advantage of smart thermostat hub 200 is that thermostats may be centrally located within a structure for which they provide control of an HVAC system, such as a central location within an apartment of a multi-family residential property. This may be advantageous as it enables smart hub functionality to be centralized with respect to the apartment, thereby increasing the likelihood that smart hub's one or more second communication interfaces (e.g., communication interfaces for interacting with smart devices), which may utilize communication links having short range communication capabilities, are within communication range of smart devices present in the apartment, such as an offline door lock.

Figure 4:
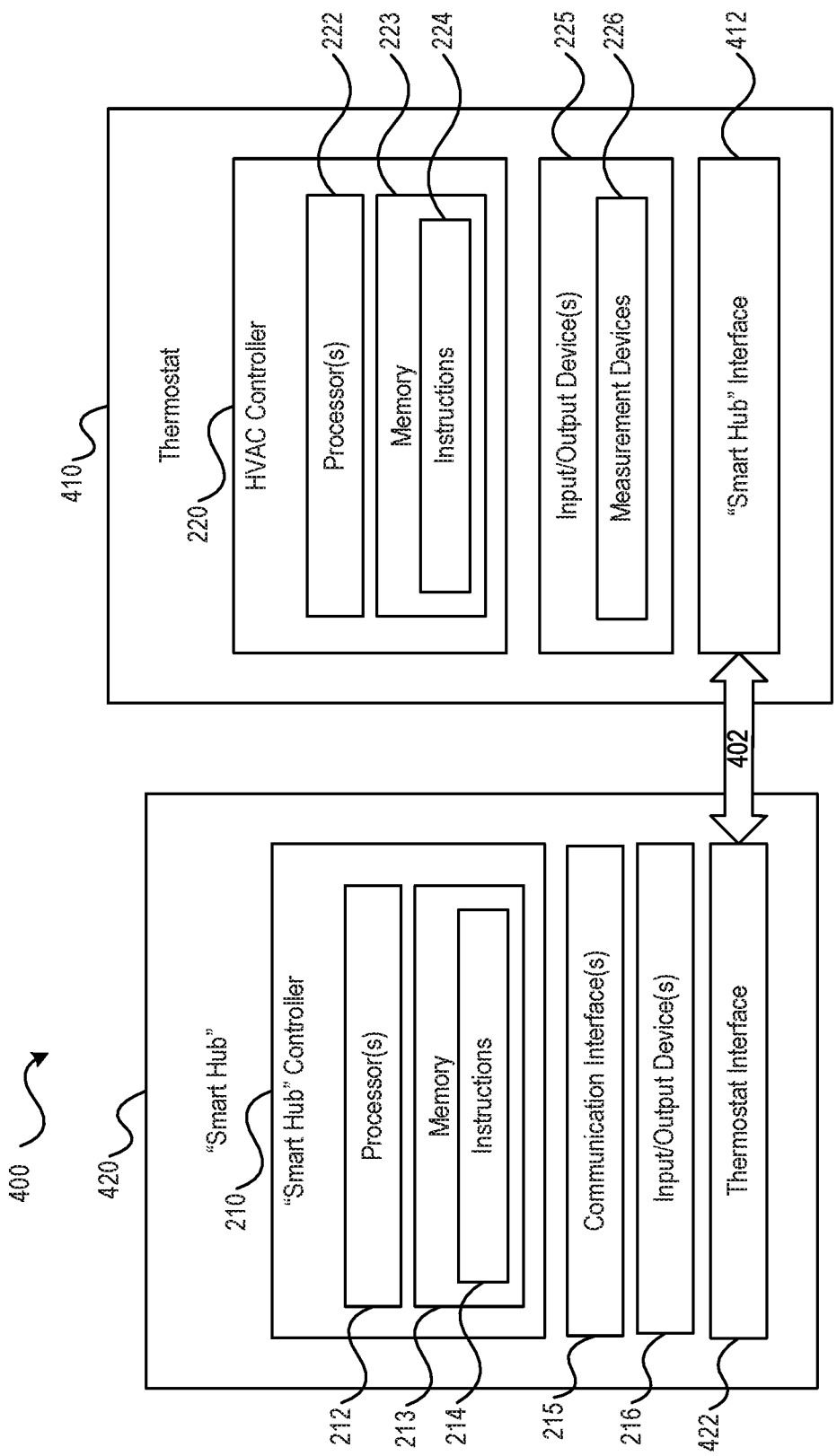
FIG. 4 is a block diagram of a modular smart thermostat hub in accordance with embodiments of the present disclosure.

Referring to FIG. 4, a block diagram of a modular smart thermostat hub in accordance with embodiments of the present disclosure is shown as modular smart thermostat hub 400. As shown in FIG. 4, the modular smart thermostat hub may comprise a thermostat component 410 and a smart hub component 420. Thermostat component 410 may comprise the components of smart thermostat hub 200 that provide control over an HVAC system of a structure, such as HVAC controller 222 (including the one or more processors 222 and memory 223 storing instructions 224) and I/O devices 225 (including the measurement devices 226). Smart hub component 420 may include components of smart thermostat hub 200 of FIG. 2 and/or smart hub 300 of FIG. 3 that provide the above-described improvements with respect to security and property management through utilization of smart devices, such as an offline door lock, a thermostat, lights fixtures, and the like. For example, as illustrated in FIG. 4, smart hub component 420 may comprise smart hub controller 210 (including the one or more processors 212 and memory 213 storing instructions 214), communication interfaces 215, and I/O devices 216.

Additionally, thermostat component 410 may comprise a smart hub interface 412 and smart hub component 420 may comprise a thermostat interface 422. The modular smart thermostat hub 400 may be formed by coupling smart hub interface 412 and the thermostat interface 422, as shown at arrow 402. For example, smart hub interface 412 may comprise one or more pins and the thermostat interface 422 may comprise a connector configured to couple the one or more pins of smart hub interface 412. Alternatively, the thermostat interface 422 may comprise one or more pins and smart hub interface 412 may comprise a connector configured to couple the one or more pins of the thermostat interface 422. It is noted that although smart hub interface 412 and the thermostat interface 422 have been described as being coupled via one or more pins and a connector, this exemplary technique for interfacing smart hub component 420 and thermostat component 410 has been provided for purposes of illustration, rather than by way of limitation and that other techniques and components may be used to couple smart hub component 420 and thermostat component 410.

As shown above, the modular smart thermostat hub 400 may comprise separate components (e.g., thermostat component 410 and smart hub 420) that, when coupled, facilitate the operations for providing the enhanced security features for managing and securing offline door locks and the improved property management functionality, as described herein. The modular design of the modular smart thermostat hub 400 may provide various advantages over smart thermostat hub 200 and smart hub 300 described above. For example, due to the modular design, a multi-family residential property may be incrementally upgraded to provide the various features described herein, such as installing thermostat component 410 at a first point in time and then installing smart hub component 420 at a second point in time that is later than the first point in time. This may allow a multi-family residential property to be upgraded over time using components (e.g., thermostat component 410 and smart hub component 420) that may be cheaper (individually) than smart thermostat hub 200, enabling the upgrades to be performed as a budget of the multi-family residential facility allows. The modular smart thermostat hub may also provide additional advantages regardless of whether the components (e.g., thermostat component 410 and smart hub component 420) of the modular smart thermostat hub are installed at the same point in time or at different points in time. For example, if thermostat component 410 of the modular smart thermostat hub 400 fails, thermostat component 410 may be replaced without replacing smart hub component 420 and if smart hub component 420 of the modular smart thermostat hub 400 fails, smart hub component 420 may be replaced without replacing thermostat component 410. Therefore, the cost of maintaining the modular smart thermostat hub 400 in an operational state over time may be less than smart thermostat hub 200 of FIG. 2. It is noted that the components of the modular smart thermostat hub 400 may be provided within a single housing. For example, thermostat component 410 may comprise a housing that includes a cavity or space within which smart hub component 420 may be provided. The cavity or space within the housing may be accessible through an access panel of the housing.

It is noted that each of the different smart hub configurations illustrated in FIGS. 2-4, which are configured to utilize LoRa-based communication links (e.g., communication link 112 of FIG. 1), provide the additional advantage of not requiring network infrastructure, such as a Wi-Fi network, to be deployed in concert with the deployment of the smart hub devices in order to facilitate operations in accordance with embodiments of the present disclosure. This significantly reduces the costs to deploy the smart hubs in a multi-family residential property. However, it is noted that even in situations where such network infrastructure is present, the LoRa-based smart hubs illustrated in FIGS. 2-4 still provide certain advantages, as described in more detail below with reference to FIG. 7.

Referring back to FIG. 1, during operation of system 100, residents of a multi-family residential property may be provided with access credentials, as described with reference to credential management module 137. Access credentials may be provided to the residents via user devices 140 or third party devices 160. Exemplary user devices 140 may include a resident's smartphone, tablet computing device, smartwatch, or other electronic devices having appropriate functionality for interacting with an offline door lock, such as functionality enabling communication via NFC, Bluetooth, ZigBee, Zwave, and the like. Exemplary third party devices 160 may include fobs or smartcards provided by the multi-family residential property, such as by an employee or property manager associated with the multi-family residential facility.

In an embodiment, access credentials may also be provided to the user devices 140 via a cloud-based service 152 accessible via a network 150, such as the Internet. For example, a property management entity associated with a multi-family residential facility may provide a website and/or mobile application that residents may utilize to obtain access credentials. The website and/or the mobile application may enable residents to interact with the cloud-based service 152 to request access credentials. The cloud-based service 152 may be configured to generate access credentials in a manner similar to the techniques described above with respect to credential management module 137 of server 130. For example, after authenticating a resident, the cloud-based service 152 may generate an access credential based on information stored in a database, such as the credential database described above. Once generated, the cloud-based service 152 may provide access credential to the resident's user device.

As described above, generation of credentials may not require interaction with an offline door lock. Instead, access credential may be generated such that when access credential is presented to the offline door lock (e.g., via placing a device loaded with access credential in proximity to the offline door lock), a result (e.g., a hash value or other information) generated by the credential processing logic of the offline door satisfies an access authorization criterion. The access authorization criterion may comprise a pre-determined value (e.g., a pre-determined hash value or other information) or may comprise a range of pre-determined values. Utilizing access authorization criteria comprised of a range of pre-determined values may facilitate various advantageous features of system 100.

For example, as access credentials are generated, by either the cloud-based service 152 or credential management module 137, each access credential may be configured to result in a different value within the pre-determined range of values of the corresponding offline door lock, and information that identifies each individual to which an access credential is provided may be recorded (e.g., at the credentials database or another database). The offline door lock may comprise a memory configured to log information associated with each access credential presented to the offline door lock, such as the result generated by the processing logic of the offline door lock in response to presentation of an access credential and timestamp information associated with a time when access credential was presented. The logged information may also include information associated with a state of the offline door lock at the time access credential is present. For example, the state of the offline door lock may be configurable to change between a locked state and an unlocked state, as described above. Each time the state of the offline door lock changes, information indicating the current state of the offline door lock and the time of the state change may be recorded in memory of the offline door lock.

The log of information recorded by the offline door lock may be subsequently retrieved to audit access of the offline door lock. To illustrate, smart hub 110 may be configured to periodically generate and transmit an audit log request that may be transmitted to the offline door lock via a communication link provided by the one or more second communication interfaces of smart hub 110. In response to the request, the offline door lock may transmit the log of information to smart hub 110 via the communication link. Upon receiving the log of information, smart hub 110 may transmit the log of information to server 130 via a communication link provided by first communication interface (e.g., the LoRaWAN communication interface) and server 130 may store the log of information in the one or more database 135, such as at an access audit log database. Smart hub 110 may be configured to preform retrieval of the log of information from the offline door lock and transmission of the log of information to server 130 according to scheduling information provided by server 130 via LoRaWAN communication link. For example, the data transmission bandwidth provided by LoRaWAN communication links is lower than other types of wireless communication links, such as Wi-Fi, and therefore, transmission of the log of information may take appreciable time. By scheduling transmission of the log of information to server 130 at specific times, which may correspond to off-peak hours (e.g., overnight), interference with other smart hubs of a multi-family residential property may be minimized, which may ensure more reliable communication with smart hubs of the multi-family residential property in an emergency or priority situation, such as if a credential for an offline door lock needs to be disabled.

Additionally or alternatively, server 130 may transmit control information to smart hub 110, where the control information comprises information that identifies the offline door lock and instructs smart hub 110 to obtain at least a portion of the log of information (e.g., information associated with all access credentials presented to the offline door lock, invalid (denied) access credentials presented to the offline door lock, valid access credentials presented to the offline door lock; information associated with changes in the state (actuation events) of the offline door lock; a current state of the offline door lock; and the like), where the portion of the log of information may be specified temporally (e.g., a portion of the log information corresponding to a particular period of time, such as a specified hour, range of hours, day, number of days, a week, and the like), by event type (e.g., state changes, received valid and/or invalid access credentials, disablement of access credentials, authorization of new access credentials, and the like), or both temporally and by event type (e.g., occurrences of one or more particular event types during one or more defined periods of time). It is noted that temporal portions of the retrieved log information may include consecutive time units, such as portions of the log information captured during a consecutive number of hours, days, weeks, and the like. Additionally, the temporal portions of the retrieved log information may include disjoint time units, such as portions of the log information captured on a first day in a week and a third day of the week, a first number of hours in the morning of a particular day and a second number of hours during the evening of the particular day or another day, and the like. The retrieved access log information may include information that identifies particular access credentials associated the retrieved portion(s) of the information logged by the offline door lock. The ability to probe the offline door lock via control information transmitted by server 130 may improve the security of a multi-family residential property. For example, if a resident is unsure of whether his/her apartment was locked when they left, the resident may contact property management personnel to inquire about the status of the offline door lock, and the property management personnel may utilize a property management platform provided by server 130 to transmit control information to smart hub 110 associated with the resident's apartment. In this example, the control information may identify the offline door lock associated with the resident's apartment and may specify that smart hub 110 is to retrieve only the current status of the offline door lock (e.g., whether the offline door lock is in the locked state or the unlocked state), rather than the entire log of information stored at memory of the offline door lock. By only retrieving the current state of the offline door lock, the requested information may be returned to server 130 more quickly. If the status of the offline door lock is determined to be unlocked, the property management personnel may visit the resident's apartment and secure the offline door lock (e.g., place the offline door lock in the locked state).

In an embodiment, a resident may initiate a status check of the offline door lock via cloud-based service 152. For example, the resident may access the website or mobile application providing a graphical user interface that facilitates interaction with the cloud-based service 152. The graphical user interface may provide functionality that enables the resident to view the log of information associated with the offline door lock of the resident's apartment, as well as initiate a status check request to determine a current state of the offline door lock. When a status check request is initiated via the graphical user interface provided by the website or mobile application, the cloud-based service 152 may initiate transmission of a status check request message to server 130 via the network 150. The status check request message may include information identifying the offline door lock for which the status check has been request, such as information that identifies the resident, the resident's apartment number, an offline door lock identifier corresponding to the offline door lock of the resident's apartment, or other information that may be used to identify smart hub located at the resident's apartment. Upon receiving the status check request message, server 130 may obtain information indicating the current status of the offline door lock of the resident's apartment by transmitting control information to smart hub located at the resident's apartment via a LoRaWAN communication link, as described above.

Upon receiving the status information from smart hub, server 130 may provide the status information to the cloud-based service 152, which may present information associated with the current status of the offline door lock to the resident via the graphical user interface. The status information may be provided from server 130 to the cloud-based service 152 in a variety of ways. For example, server 130 may store the status information at the access audit log database and then transmit a message to the cloud-based service 152 that indicates the status check request is complete. The cloud-based service 152 may then retrieve the status information from the access audit log database for presentation to the resident via the graphical user interface. Additionally or alternatively, server 130 may include information that indicates the current status of the offline door lock in the response message, which eliminates the need for the cloud-based service 152 to access the access audit log database.

If the status of the offline door lock is determined to be unlocked, the resident may contact property management personnel to request that they visit the resident's apartment and secure the offline door lock (e.g., place the offline door lock in the locked state). The resident may contact the property management personnel to request that the resident's offline door lock be secured via a phone call, a text message (e.g., a text message sent to a number associated with the multi-family residential property for reporting maintenance requests, door security verification requests, and the like), an e-mail message, an instant message (e.g., an instant message created using functionality of the graphical user interface) provided to a device associated with property management personnel, or another method. In an embodiment, a confirmation notification may be provided to the resident once the offline door lock has been secured by the property management personnel.

It is noted that smart hub 110 may also be configured to maintain one or more activity logs, which may be periodically retrieved, in whole or in part, via the LoRa-based communication link 112 and LoRa-gateway 136 by the property management platform. Such activity logs may include information associated with various smart devices, such as information that provides historical information associated with how a resident's thermostat is configured (e.g., preferred temperatures, etc.), whether various smart devices, such as lights, were left on for prolonged periods of time, etc. Such information may provide insights into the preferences of the residents of a multi-family residential property, which may be used to automatically customize other experiences of the resident. For example, a resident may gain access to a particular area of the multi-family residential property, such as a game room, a media room, and the like, by presenting the resident's access credential. Such access may be detected (e.g., via periodic probing of offline door locks associated with common areas of the multi-family residential property by one or more smart hubs associated with the common areas or via automatic transmission of access information to the one or more smart hubs by the offline door lock via a non-LoRa-based communication link) and utilized to configure the particular area to perceived preferences of the resident (e.g., a preferred temperature, etc.), where the perceived preferences are derived from the activity log maintained by the smart hub associated with the resident's apartment.

As briefly described above, server 130 may provide a property management platform that may be utilized to manage various aspects of a multi-family residential property. The property management platform may provide one or more graphical user interfaces that facilitate interaction with smart hubs installed at apartments of the multi-family residential property. To illustrate, the property management platform (e.g., server 130 or a cloud-based implementation of the functionality provided by server 130) may provide a graphical user interface that enables access credentials associated with an offline door lock to be disabled remotely. Via this graphical user interface, a property management user may view access credentials authorized for a particular offline door lock and select one or more access credentials that are to be disabled. Upon confirming which access credential(s) is to be disabled, server 130 may identify one or more smart hubs of the multi-family residential property associated with offline door locks for which the access credential(s) has been authorized (e.g., may be used to lock or unlock the offline door lock(s)), and may transmit control information to the identified smart hubs. For each of the identified smart hubs, the control information may identify the offline door lock and the access credential(s) that is to be disabled for the identified offline door lock.

As explained above, control information provided to a smart hub may include information that identifies one or more smart devices to which the control information pertains and information associated with one or more actions or parameters for modifying a configuration of the one or more smart devices. Continuing with this example, upon receiving the control information from server 130, smart hub(s) may identify one or more smart devices (e.g., one or more offline door locks) and may derive one or more commands for controlling the one or more identified smart devices in accordance with the control information, such as commands to disable access credentials specified in the control information at the identified offline door lock. Having determined the one or more smart devices to which the received control information pertains and deriving appropriate commands for controlling the one or more smart devices in accordance with the control information, smart hub(s) may initiate transmission of the derived commands to the smart devices via communication links provided by second communication interface (e.g., the non-LoRaWAN communication interface), and the smart devices may execute the commands. For example, upon receiving the commands, an offline door lock may disable the identified access credentials. In an embodiment, the offline door lock may disable an access credential by configuring a flag associated with the access authorization criteria used by the processing logic of the offline door lock to authenticate presented access credentials. A first value of the flag may indicate access credential is authorized to configure the offline door lock to the locked state and the unlocked state and a second flag value may indicate that access credential has been disabled. Once disabled, access credential may not be used to configure the offline door lock to the unlocked state or the locked state. In an embodiment, offline door locks may comprise an automatic locking mechanism that automatically configures the offline door lock to the locked state when a disable access credential is present. This may further enhance security since an offline lock that is in the unlocked state may be automatically transitioned to the locked state when a disable access credential is presented.

In addition to remotely disabling access credentials, property management personnel may manually disable access credentials associated with offline door locks of system 100, such as by coupling an external device (e.g., a laptop computing device, a tablet computing device, etc.) to the offline door lock and then using an application or utility provided by the external device to manage access credentials. In an embodiment, server 130 may be configured such that access credentials that have been disabled may not be re-enabled via smart hub 110. In this embodiment, a disable access credential may only be re-enabled by coupling the external device to the offline door lock, as described above. In an embodiment, disable access credentials may be re-enabled via control information provided to smart hub 110 by server 130. However, if such capability is provided, system 100 may be configured to require one or more users to authorize the re-enablement of access credential. For example, a manager, supervisor, or other member of property management personnel may need to provide a password in order to re-enable access credential via server 130 and smart hub 110. As another example, remotely re-enabling an access credential via server 130 and smart hub 110 may require authorization from a member of the property management personnel and the resident associated with the offline door lock where access credential is disabled. Requiring the resident to participate in the authorization to remotely enable an access credential may prevent a nefarious individual from gaining entry into the resident's apartment.

In an embodiment, access credentials may also be created (e.g., by either the credential management interface 130 or the system of the third party) that comprise information designed to disable another access credential when used. For example, suppose that a first access credential is to be disabled. A second access credential may be generated and configured to include information that is configured to disable the first access credential when the second access credential is presented to a particular offline door lock. The information for disabling the first access credential may include information that identifies the first access credential and other information that specifies an operation associated with the first access credential, such as to disable the first access credential. When the second access credential is presented to the offline door lock, the information for disabling the first access credential may be detected by the offline door lock in addition to detecting the second access credential, thereby enabling the second access credential to be used to change a stat of the offline door lock while also disabling the first access credential. It is noted that such techniques may be utilized to disable multiple access credentials, rather than a single access credential, and may also be utilized to disable one or more access credentials at multiple different offline door locks (e.g., by presenting the second access credential carrying the information for disabling the first access credential at multiple offline door locks where the first access credential has been previously authorized for use). Additionally, access credentials carrying information configured to disable one or more other access credentials may be presented to offline door locks via a user device (e.g., a smartphone, etc.) or via a third party device (e.g., a fob, a smartcard, etc.).

In addition to providing functionality for managing access credential, the property management platform provided by server 130 may also provide graphical user interfaces and features that facilitate intelligent management of a multi-family residential property. For example, the one or more database 135 may include a resident database that includes information associated with vacant apartments of the multi-family residential property, move-in dates associated with new residents, and move-out dates associated with departing residents. The property management platform may utilize this information to control and automate various property management tasks. For example, the property management platform may periodically (e.g., daily, weekly, monthly, etc.) analyze the resident databased to identify move out dates. When a move out date occurs, the property management platform may transmit control information to a smart hub 110 of the vacated apartment via the first communication link (e.g., LoRaWAN communication link) to place various smart devices of the apartment into a vacant mode. To illustrate, the control information may identify the thermostat (e.g., the thermostat of smart thermostat hub 200 of FIG. 2 or thermostat component 410 of FIG. 4) of the vacated apartment and may include parameters specifying a temperature that the thermostat should be configured to while vacant. Smart hub 110 may receive the control information, detect that the control information is associated with the thermostat (e.g., based on device identification information included in the control information, and transmit one or more commands to the thermostat via the second communication link (e.g., a non-LoRaWAN communication link) to modify one or more operational settings of the thermostat in accordance with the control information. The one or more operational settings control at least one of a temperature setting of the thermostat and an operating mode of the thermostat, the operating mode configurable to change between a heating mode, a cooling mode, and an off mode (e.g., to turn the thermostat off).

In an embodiment, the control information may include scheduling information that specifies periods of time during which the thermostat is to be placed in a particular operating mode. For example, the thermostat scheduling information may specify first information that specifies the thermostat is to be configured to a first operating mode (e.g., the heating mode, the cooling mode, or the off mode) for a first period of time and second information that specifies the thermostat is to be configured to a second operating mode (e.g., the heating mode, the cooling mode, or the off mode) that is different from the first operating mode for a second period of time. The first information may be utilized to at least partially heat the vacant apartment during at least a portion of the night during winter months or cool the apartment during at least apportion of the day during summer months. The particular temperatures associated with the first information and the second information may be determined to mitigate potential damage caused by seasonal temperatures, such as to prevent freezing of water pipes, etc. or prevent damage to paint or other potentially heat sensitive surfaces of the apartment. The second information may configure the thermostat to the off mode to minimize the operating costs associated with the vacant apartment. In an embodiment, the thermostat scheduling information may be dynamically generated. For example, the property management platform may be configured to receive weather data (e.g., via an RSS feed or from another third party source of weather information), and may generate commands to control the configuration of the thermostat based on the weather information, such as to place the thermostat in the heating mode if the weather data indicates severely cold temperatures are expected. As the weather data changes, updates thermostat configuration information may be generated and provided to the thermostat via the smart hub 110, as described herein.

As another example, the control information may identify one or more smart light fixtures of the vacated apartment and may include information that indicates the light fixtures are to be turned off. Smart hub 110 may receive the control information, detect that the control information is associated with the one or more smart light fixtures, and transmit one or more commands to the one or more smart light fixtures via the second communication link (e.g., the non-LoRaWAN communication link) to turn the one or more smart light fixtures off. Alternatively, the control information may specify that one or more of the smart light fixtures of the vacant apartment are to be, at least periodically, turned on. In such instances, smart hub 110 may transmit additional commands to turn on any smart light fixtures based on the control information, which may include scheduling information that indicates times and dates for turning each applicable light fixture on and/or off.

By using server 130 and smart hub 110 to place vacated apartments into the vacant mode, operating costs associated with the multi-family residential property may be significantly reduced. For example, if a thermostat in a vacated apartment is configured to cool the vacated apartment to a low temperature, the thermostat may remain configured in that state until a new resident moves into the apartment. Operating an HVAC system to cool a vacant apartment for a potentially long period of time may result in significant costs, which are avoided using the above-described techniques.

To illustrate, suppose that a resident prefers a "cold" apartment and configures the thermostat to maintain the apartment at a particular temperature (e.g., <75° F.). If, during a walkthrough performed in connection with the resident vacating the apartment, the thermostat setting is not noticed, the apartment may continue to be cooled in accordance with the settings configured by the resident, thus maintaining the now vacated apartment at the temperature preferred by the former resident. This may cause the property owner (or property management company) to incur significant unnecessary costs associated with cooling a vacant apartment. However, as described herein, a property management platform in accordance with embodiments of the present disclosure may automatically detect (e.g., based on information stored in the one or more databases 135) the apartment has been vacated and via the smart hub 110, may configured the thermostat to the vacant mode, which configures the thermostat's temperature setting to maintain the vacant apartment at a temperature specified by the property management company. This temperature may be higher than temperatures typically configured by residents, such as 80° F. Thus, while the apartment is vacant, the thermostat may maintain the apartment at a higher temperature, resulting in reduced costs during the duration of the vacancy. In an embodiment, the vacant mode may further be configured to turn the thermostat off, at least periodically, such that the HVAC system is not operated at all, which may further reduce the costs associated with the vacant apartment.

Similarly, the above-described techniques for placing a vacant apartment into vacant mode may also eliminate costs associated with light fixtures being allowed to remain on in a vacant apartment. It is noted that in addition to facilitating control of smart devices within apartments of a multi-family residential property, the property management platform may also be utilized to control smart devices associated with public areas of a multi-family residential property, such as gyms, conference rooms, game rooms, parking lots/garages, walking paths, and other common spaces maintained by the property management personnel. For example, the above-described techniques may be utilized to transmit control information to smart hubs communicatively coupled to smart light fixtures and/or thermostats associated with such areas of the multi-family residential property to minimize power consumption and associated costs, such as turning the smart light fixtures off at a particular time (e.g., when a common space is deemed closed), turning the smart light fixtures on at a particular time, such as to light up pathways at night, or increasing the temperature of thermostats at a particular time (e.g., when the leasing office or other area is closed). Further, the property management platform may utilize the above-described techniques to verify whether any offline door locks associated with the areas of the multi-family residential property maintained by the property management personnel were left unlocked, and transmit a notification to a member of the property management if any offline door locks are detected to be in the unlocked state, such as an offline door lock associated with the leasing office.

From the foregoing, it is to be appreciated that the various devices illustrated in FIG. 1, as well as they features they provide, represent a significant improvement to technologies for managing aspects of a multi-family residential property. For example, system 100 utilizes LoRaWAN communication links to provide backhaul communication between a central location, such as a leasing office, and smart hubs located at the various apartments of the multi-family residential property, system 100 does not require a mesh network or Wi-Fi network to be deployed. This significantly reduces the costs associated with deploying an intelligent property management system, such as system 100 described above, and makes it feasible to deploy intelligent property management systems in certain types of multi-family residential properties for which previous technologies requiring mesh or Wi-Fi networks were cost prohibitive, such as Class B and Class C properties. System 100 also provides features that improve the security of multi-family residential properties, such as by enabling credentials for offline door locks to be remotely disabled via smart hub 110 and allowing offline door locks to be probed for information associated with a state of the offline door lock or to obtain access log information. Additionally, system 100 provides features that improve property management capabilities, such as by automatically placing vacant apartments into a vacant mode designed to improve the energy efficiency and reduce the operating costs of the multi-family residential property.

Figure 5:
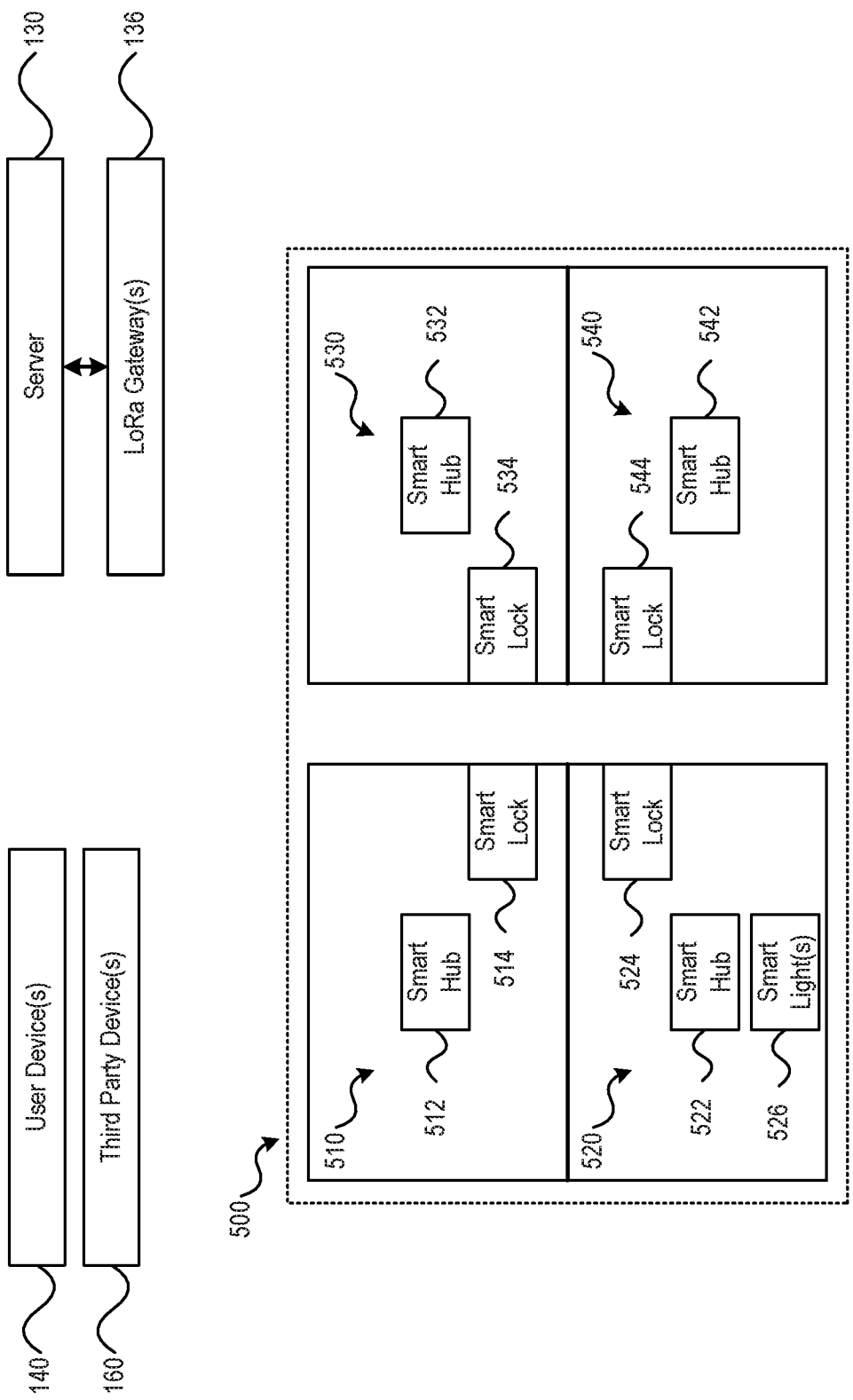
FIG. 5 is a block diagram illustrating aspects of an intelligent property management system configured in accordance with embodiments of the present disclosure.

Referring to FIG. 5, a block diagram illustrating aspects of an intelligent property management system configured in accordance with embodiments of the present disclosure is shown. As shown in FIG. 5, a building 500 of a multi-family residential property may include a plurality of apartments 510, 520, 530, 540. The apartments 510, 520, 530, 540 may include smart hubs 512, 522, 532, 542, respectively, which may comprise smart thermostat hub 200 of FIG. 2, smart hub 300 of FIG. 3, or the modular smart thermostat hub 400 of FIG. 4. Additionally, each of the apartments 510, 520, 530, 540 may include an offline door lock, illustrated in FIG. 5 as offline door locks 514, 524, 534, 544. Each of smart hubs 512, 522, 532, 542 may communicate with server 130 via a first communication link (e.g., a LoRaWAN communication link) and may communicate with one or more smart devices, such as thermostat or the offline door locks 514, 524, 534, 544, via a second communication link (e.g., a non-LoRaWAN communication link).

As described above, smart hubs 514, 524, 534, 544 may be utilized to control various smart devices present within the respective apartments of the building 500. For example, suppose that a resident of the apartment 510 left for work and was not sure whether he locked the offline door lock 514 on his way out. As described above with reference to FIG. 1, the resident may utilize a user device 140, such as a smartphone, to access a cloud-based service (e.g., the cloud-based service 152 of FIG. 1) to obtain the current status of the offline door lock 514. If the resident discovers that he did forget to lock the offline door lock 514, the resident may request that property management personnel visit the apartment 510 and secure (e.g., lock) the offline door lock 514. Once secured, the resident may be notified.

As another example, suppose that two residents live in apartment 530 and each of the residents have an access credential loaded onto a third party device 160, such as a fob or smartcard. If one of the residents living in apartment 530 becomes violent toward the other resident, it may be necessary to prevent the aggressor resident from gaining access to apartment 530. As described above, previous systems that utilized offline door locks would require property management personnel to physically visit the apartment 530 and connect an external device to the offline door lock 534 in order to disable the aggressors access credential. Depending on the urgency with which the credential needs to be disabled, the property management personnel may not arrive in time to prevent the aggressor resident from gaining entry to the apartment 530 and causing harm to the other resident. However, utilizing the property management platform provided by server 130, property management personnel may remotely disable the aggressor resident's access credential by transmitting control information to smart hub 532, where the control information causes smart hub 532 to communicate with the offline door lock 534 to disable access credential. As can be appreciated, this functionality enables access credentials to be disabled quickly, significantly enhancing the security services that may be provided to the residents of the multi-family residential property.

In yet another example, suppose that a resident of apartment 520 has moved out and apartment 520 is now vacant. As described above, the property management platform provided by server 130 may detect the status of the apartment 520 is now vacant and may automatically transmit control information to smart hub 522 to place various smart devices into vacant mode. For example, based on the control information, smart hub 522 may turn off one or more smart lights 526 within the apartment 520 and may configure a thermostat (not shown in FIG. 5) of the apartment 520 to a predetermined temperature. This capability may significantly reduce the power consumption of the multi-family residential facility, resulting in significant cost savings. Additionally, the control information provided to smart hub 522 may instruct smart hub 522 to communicate with the offline door lock 524 to disable the former resident's access credentials. This may prevent the former resident or someone possessing the former resident's access credentials from gaining unauthorized access to the apartment after resident has moved out.

Now suppose that apartment 540 is currently vacant, but a new resident is scheduled to move in soon. On the day the new resident is to move in, the property management platform provided by server 130 may transmit control information to smart hub 542 that instructs smart hub 452 to adjust a temperature setting of the thermostat for the apartment 540 in advance of the resident moving in. For example, the control information may be configured to cause the thermostat to start cooling the apartment an hour ahead of a scheduled move in time or at some pre-determined time of day so that the apartment is cooler (relative to the vacant mode) when the resident moves in.

Referring to FIG. 6, a block diagram illustrating additional aspects of an intelligent property management system configured in accordance with embodiments of the present disclosure is shown. As shown in FIG. 6, a multi-family residential property 610 may include a plurality of buildings 611, 612, 613, 614, 615, 616, 617, 618, each building having one or more floors and each floor having at least one apartment. As described an illustrated with respect to FIG. 5, each of the apartments may include a smart hub (e.g., smart thermostat hub 200 of FIG. 2, smart hub 300 of FIG. 3, or the modular smart thermostat hub 400 of FIG. 4), an offline door lock, and other smart devices. Each of smart hubs associated with the apartments of the buildings 611, 612, 613, 614, 615, 616, 617, 618 may communicate with a server providing a management platform that provides various advantageous features for managing a multi-family residential property.

As illustrated in FIG. 6, intelligent property management systems in accordance with embodiments of the present disclosure may include a one or more LoRa gateways 620 in conjunction with server 130. The one or more LoRa gateways 620 may be configured to communicatively couple one or more smart hubs to server 130 and/or to provide overlapping coverage areas for failover purposes. For example, the communication capabilities of LoRa-based communication links may degrade in some environments or conditions, such as environments with many buildings. In such cases, providing the one or more LoRa gateways 620 may ensure that all smart hubs deployed in a multi-family residential property are communicatively coupled to server 130. In an embodiment, the LoRa gateway(s) 620 may be communicatively coupled to server 130 via a wired communication link (e.g., an Ethernet communication link) or wireless communication link (e.g., a hotspot or other wireless access point providing the LoRa gateway with network-based access to server 130). In an embodiment, utilizing the one or more LoRa gateways 620 may enable server 130 to be located at a location other than the multi-family residential property, such as at a corporate office of an entity that owns the multi-family residential property or at another location, or to enable the functionality provided by the server 130 to be access from the cloud. In such instances, access to the property management platform provided by server 130 may be facilitated through a web-based interface, which may be provided by the cloud-based service 152 of FIG. 1.

Referring to FIG. 7, a block diagram illustrating additional aspects of an intelligent property management system configured in accordance with embodiments of the present disclosure is shown. As shown in FIG. 7, a multi-family residential property 700 may include a plurality of buildings 710, 720, 730, 740, 750, 760, each building having one or more floors and each floor having at least one apartment. As described an illustrated with respect to FIG. 5, each of the apartments may include a smart hub (e.g., smart thermostat hub 200 of FIG. 2, smart hub 300 of FIG. 3, or the modular smart thermostat hub 400 of FIG. 4), an offline door lock, and other smart devices. Each of smart hubs associated with the apartments of the buildings 710, 720, 730, 740, 750, 760 may communicate with server 130, which provides a property management platform that provides various features for managing a multi-family residential property, as described above with reference to FIGS. 1-4.

Although not wired and/or wireless communication infrastructure, such as Wi-Fi is not necessary to facilitate operation of intelligent property management systems in accordance with the embodiments disclosed herein, such features may provide additional capabilities when present. For example, as illustrated in FIG. 7, a plurality of access points 712, 722, 732, 742, 752, 762 may be communicatively coupled to server 130 via wired communication links (e.g., Ethernet, etc.) and/or wireless communication links (e.g., Wi-Fi communication links). The bandwidth capabilities provided by the access points 712, 722, 732, 742, 752, 762 may enable the intelligent property management system to provide video capabilities. For example, in FIG. 7, each of the buildings 710, 720, 730, 740, 750, 760 may be equipped with one or more video cameras 714, 724, 734, 742, 752, 762, respectively. The video cameras 714, 724, 734, 742, 752, 762 may be communicatively coupled to server 130 via the access points 712, 722, 732, 742, 752, 762 to facilitate video monitoring of areas of the multi-family residential property 700.

Figure 8:
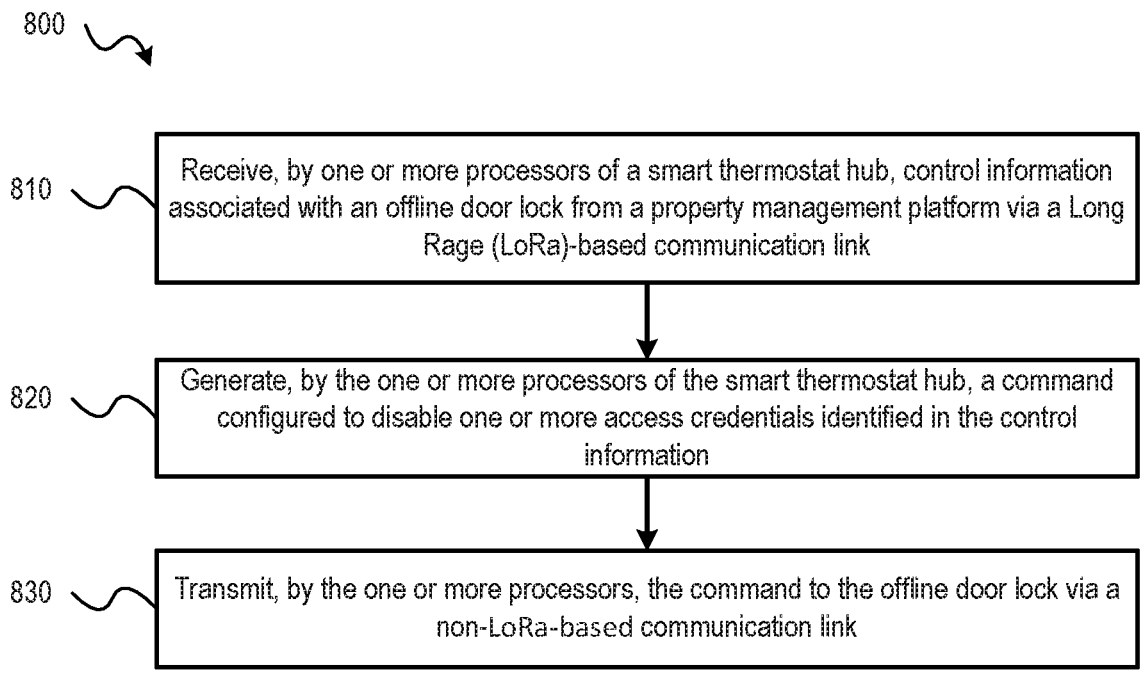
FIG. 8 is a flow diagram illustrating an exemplary method for securing smart devices within an apartment of a multi-family residential property in accordance with embodiments of the present disclosure.

Referring to FIG. 8, a flow diagram illustrating an exemplary method for securing smart devices within an apartment of a multi-family residential property in accordance with embodiments of the present disclosure is shown as method 800. In an embodiment, steps of the method 800 may be stored as instructions that, when executed by one or more processors, cause the one or more processors to perform operations for securing smart devices within an apartment of a multi-family residential property, as described above with reference to FIGS. 1-7. It is noted that the method 800 may be performed by smart hub 110 of FIG. 1, smart thermostat hub 200 of FIG. 2, smart hub 300 of FIG. 3, and the modular smart thermostat hub 400 of FIG. 4.

As shown in FIG. 8, the method 800 may include, at step 810, receiving, by one or more processors of a smart thermostat hub, control information associated with an offline door lock from a property management platform via a LoRa-based communication link where the control information identifies one or more access credentials to be disabled with respect to the offline door lock. At a step 820, the method 800 may include generating, by the one or more processors of smart thermostat hub, a command configured to disable the one or more access credentials identified in the control information. In a step 830, the method 800 may include transmitting, by the one or more processors, the command to the offline door lock via a non-LoRa-based communication link. As described above with reference to FIGS. 1-7, by using a smart thermostat hub in accordance with embodiments of the present disclosure, the method 800 may provide improved security for residents of a multi-family residential property, such as by facilitating access credentials for an offline door lock to be disabled remotely, rather than requiring property management personnel to visit the apartment and couple an external device to the offline door lock.

It is noted that the concepts of method 800 may further facilitate additional advantageous operations. For example, instead of receiving control information for disabling access credentials of the offline door lock, smart thermostat hub may receive control information configured to control operations of a thermostat, a light fixture, or another smart device present in an apartment where smart thermostat hub is located, or may receive control information configured to retrieve status information from a memory of the offline door lock. In a manner similar to steps 810 and 820, this additional control information may be received via a LoRa-based communication link and may cause smart thermostat hub to generate one or more commands for controlling operation of smart devices identified by the control information, as described above with reference to FIGS. 1-7. After the one or more commands associated with the additional control information are generated, the smart thermostat hub may transmit the one or more additional commands to the appropriate smart devices via a non-LoRa-based communication link. Utilizing a smart thermostat hub and LoRa-based communication links to provide control information to smart devices may reduce the cost of deploying an intelligent property management system, such as the intelligent property management system described above with reference to FIG. 1. In aspects, the method 800 may also be utilized to create access credentials for one or more offline door locks, remotely unlock an offline door lock, or other operations described above with reference to FIGS. 1-7.

Figure 9:
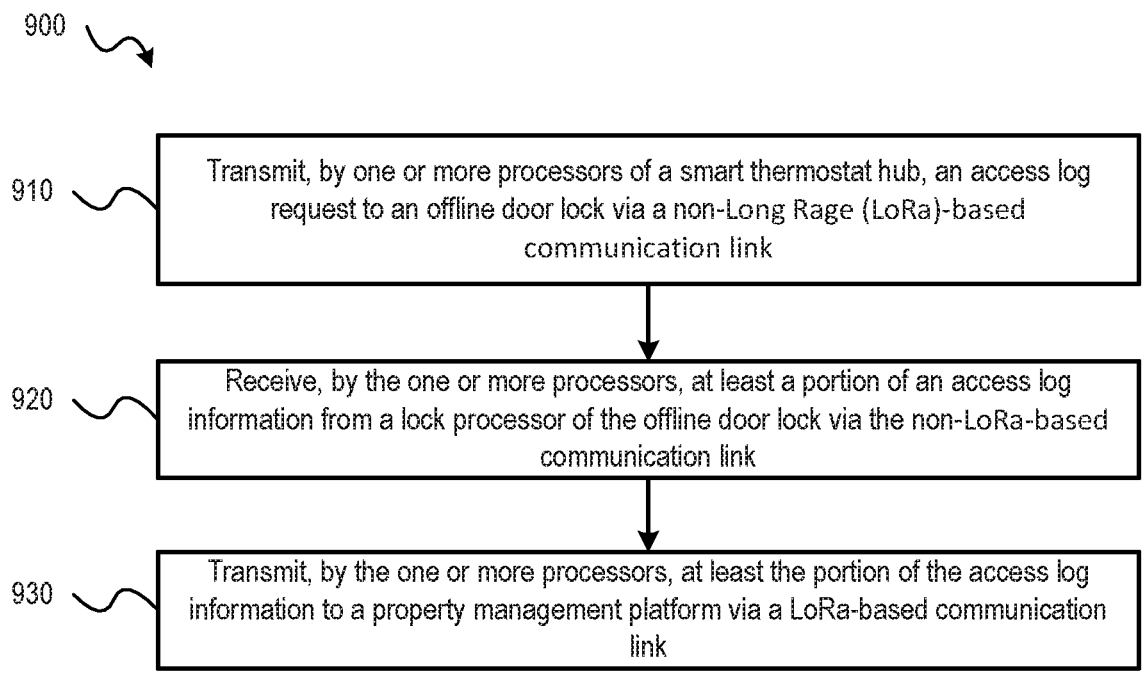
FIG. 9 is a flow diagram of an exemplary method for retrieving access log data from an offline door lock in accordance with embodiments of the present disclosure.

Referring to FIG. 9, a flow diagram of an exemplary method for retrieving access log data from an offline door lock is shown as a method 900. In an embodiment, steps of the method 900 may be stored as instructions that, when executed by one or more processors, cause the one or more processors to perform operations for securing smart devices within an apartment of a multi-family residential property, as described above with reference to FIGS. 1-7. It is noted that the method 900 may be performed by smart hub 110 of FIG. 1, smart thermostat hub 200 of FIG. 2, smart hub 300 of FIG. 3, and the modular smart thermostat hub 400 of FIG. 4.

At step 910, the method 900 includes transmitting, by one or more processors of a smart thermostat hub, an access log request to an offline door lock via a non-LoRa-based communication link. The access log request may be configured to retrieve at least a portion of access log information stored at a memory of the offline door lock. As described above with reference to FIG. 1, smart thermostat hub may be configured to transmit the access log request to the offline door lock in response to control information received from a property management platform (e.g., the property management platform provided by server 130 of FIGS. 1, 5, 6, and 7) and the control information may specify the portion of the access log to be retrieved. At step 920, the method 900 may include receiving, by the one or more processors of smart thermostat hub, at least the portion of the access log information from a lock processor of the offline door lock via the non-LoRa-based communication link and at step 930, the method 900 may include transmitting, by the one or more processors of smart thermostat hub, at least the portion of the access log information to the property management platform via a LoRa-based communication link. As described above, transmission of at least the portion of the access log information to the property management platform may be performed periodically, and may also be performed based on scheduling information received from the property management platform.

It is noted that operations of the method 900 may improve the security of residents of a multi-family residential property. For example, as described above with reference to FIGS. 1 and 5, if residents are not sure they locked the door to their apartment after they leave, the residents may access a cloud-based service (e.g., the cloud-based service 152 of FIG. 1) to determine whether they locked the door or not. The cloud-based service may be configured to communicate with the property management platform to initiate operations of the method 900 to obtain a current status of the offline door lock and provide that status to the resident(s). If the door was found to be unlocked, the resident may contact the property management office to request that property management personnel visit the apartment and secure the offline door lock.

Figure 10:
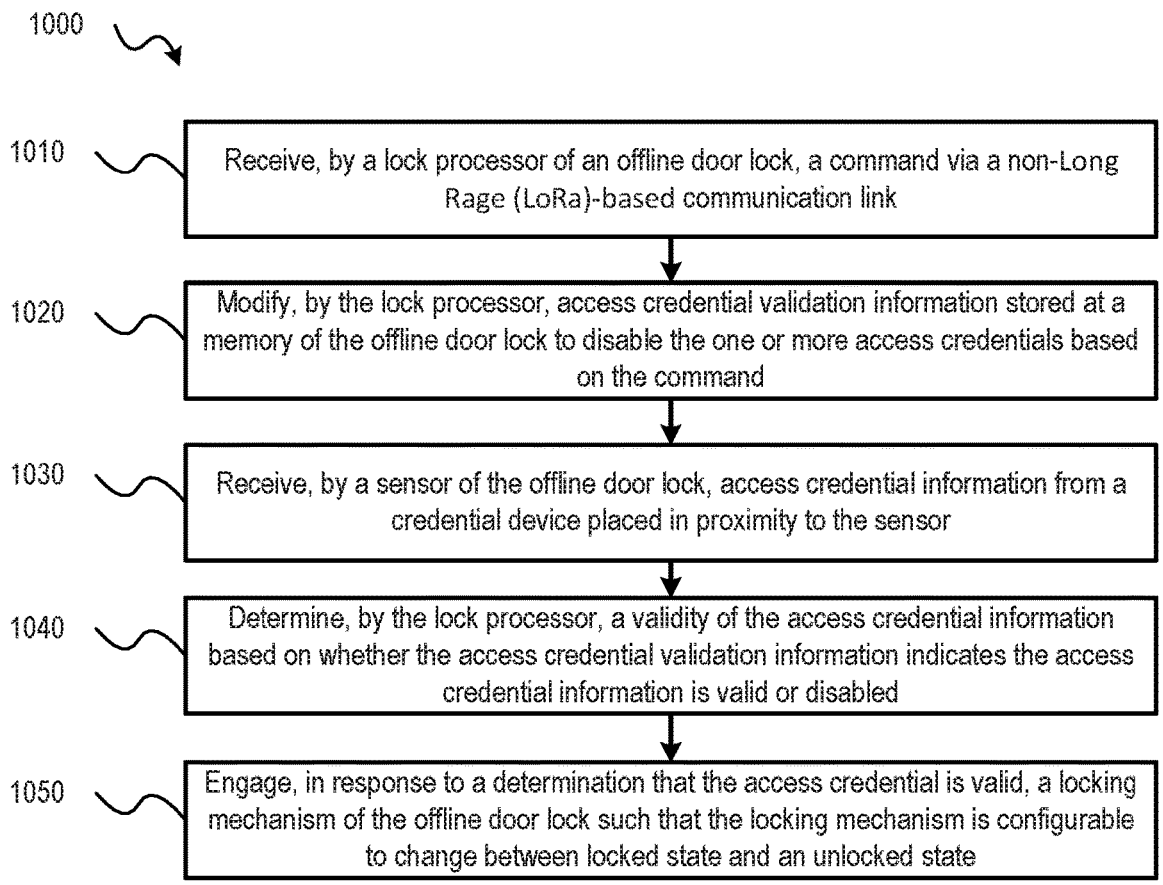
FIG. 10 is a flow diagram illustrating an exemplary method for securing an offline door lock of an apartment of a multi-family residential property in accordance with embodiments of the present disclosure.

Referring to FIG. 10, a flow diagram illustrating an exemplary method for securing an offline door lock of an apartment of a multi-family residential property in accordance with embodiments of the present disclosure is shown as method 1000. In an embodiment, steps of the method 1000 may be stored as instructions that, when executed by one or more processors, cause the one or more processors to perform operations for securing an offline door lock of an apartment of a multi-family residential property, as described above with reference to FIGS. 1-5. In an embodiment, the method 1000 may be performed by an offline door lock, such as the offline door lock 1200 of FIG. 12.

The method 1000 may include, at step 1010, receiving, by a lock processor of an offline door lock, a command via a non-LoRa-based communication link. As described above with reference to FIGS. 1 and 5, as well as FIG. 8, the command may be received from a smart thermostat hub, and may include information for disabling one or more access credentials associated with the offline door lock. At step 1020, the method 1000 may include modifying, by the lock processor, access credential validation information stored at a memory of the offline door lock to disable the one or more access credentials based on the command. As disclosed herein, modifying access credential validation information may include deleting a portion of access credential validation information corresponding to the one or more access credentials identified in the control information. Additionally or alternatively, modifying access credential validation information may include configuring one or more flags corresponding to the one or more access credentials identified in the control information to have a particular flag value. The one or more flags may be stored with access credential validation information and the particular flag value may indicate a corresponding access credential is disabled.

At step 1030, the method 1000 may include receiving, by a sensor of the offline door lock, access credential information from a credential device placed in proximity to the sensor. As described herein, the credential device may include a smartphone, a fob, a smartcard or another type of device provided with an access credential. At step 1040, the method 100 may include determining, by the lock processor, a validity of access credential information based on whether access credential validation information indicates access credential information is valid or disabled and at step 1050, the method 1000 may include engaging, in response to a determination that access credential is valid, a locking mechanism of the offline door lock such that the locking mechanism is configurable to change between locked state and an unlocked state. It is noted that the method 1000 may provide functionality that is complimentary to the functionality provided by the method 800. Additionally, as described above with reference to FIGS. 1-6, providing an intelligent property management system that includes a smart thermostat hub to enable access credentials for offline locks to be remotely disabled in accordance with the method 1000 provides improved security for residents of a multi-family residential property, such as by facilitating access credentials for an offline door lock to be disabled remotely, rather than requiring property management personnel to visit the apartment and couple an external device to the offline door lock. Further, it is noted that although the method 1000 is described as providing functionality for disabling access credentials, the method 1000 may also be utilized to provide other functionality described herein with respect to operations of an offline door lock in accordance with aspects of the present disclosure, such as authorize new credentials.

Figure 11:
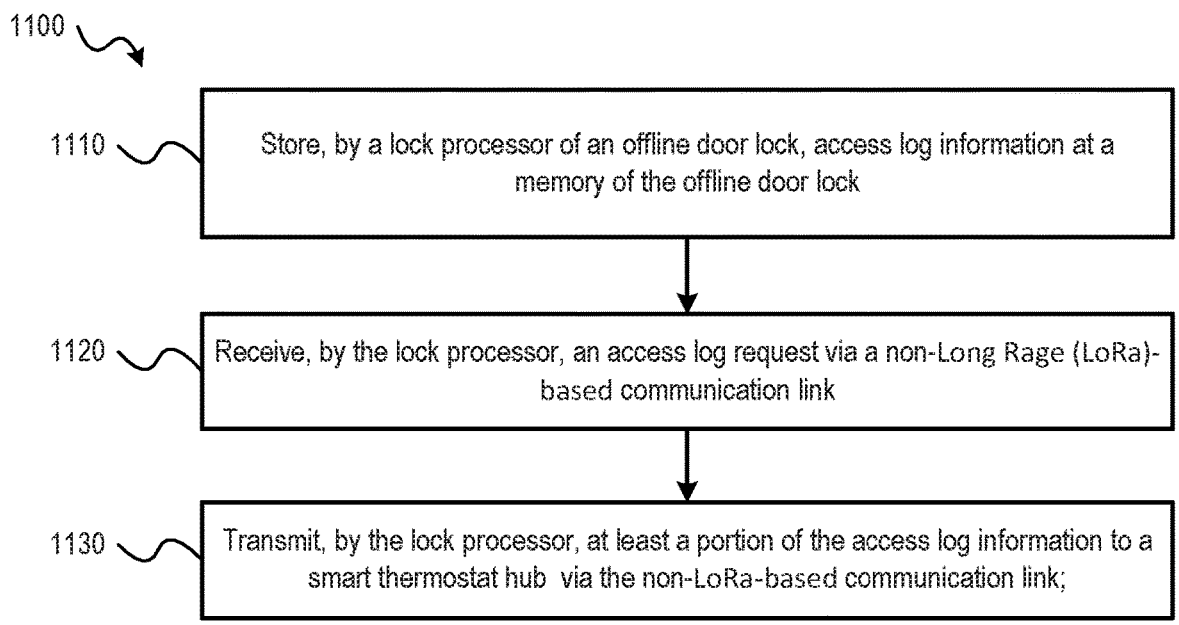
FIG. 11 is a flow diagram illustrating an exemplary method for securing an offline door lock of an apartment of a multi-family residential property in accordance with embodiments of the present disclosure.

Referring to FIG. 11, a flow diagram illustrating an exemplary method for securing an offline door lock of an apartment of a multi-family residential property in accordance with embodiments of the present disclosure is shown as method 1100. In an embodiment, steps of the method 1100 may be stored as instructions that, when executed by one or more processors, cause the one or more processors to perform operations for securing an offline door lock of an apartment of a multi-family residential property, as described above with reference to FIGS. 1 and 5. In an embodiment, the method 1100 may be performed by an offline door lock, such as the offline door lock 1200 of FIG. 12.

At step 1110, the method 1100 may include storing, by a lock processor of an offline door lock, access log information at a memory of the offline door lock. As disclosed herein, the access log may comprise access credential information associated with access credentials presented to the sensor and/or status information identifying changes to a state of a locking mechanism of the offline door lock. Additionally, the access log information may comprise time stamps associated with the time that particular information was recorded to the access log. At step 1120, the method 100 may include receiving, by the lock processor, an access log request via a non-LoRa-based communication link. At step 1130, the method 1100 may include transmitting, by the lock processor, at least the portion of the access log information to a smart thermostat hub via the non-LoRa-based communication link. As described above with respect to FIGS. 1 and 5, the access log request may be received by the lock processor from a smart thermostat hub that is in communication with a property management platform, and the request for access log information may ultimately be provided to the property management platform or another destination, such as a graphical user interface associated with the cloud-based service 152 of FIG. 1.

It is noted that the method 1100 provides functionality that is complimentary to, and may be used on coordination with, the functionality provided by the method 900. For example, as described above with reference to FIGS. 1 and 5, if residents are not sure they locked the door to their apartment after they leave, the residents may access a cloud-based service (e.g., the cloud-based service 152 of FIG. 1) to determine whether they locked the door or not. The cloud-based service may be configured to communicate with the property management platform to initiate operations of the method 900 to obtain a current status of the offline door lock and provide that status to the resident(s). If the door was found to be unlocked, the resident may contact the property management office to request that property management personnel visit the apartment and secure the offline door lock. Thus, it is to be appreciated that the operations of the method 1100, individually or in coordination with other processes, such as the method 900 described with reference to FIG. 9, may improve the security of residents of a multi-family residential property.

Figure 12:
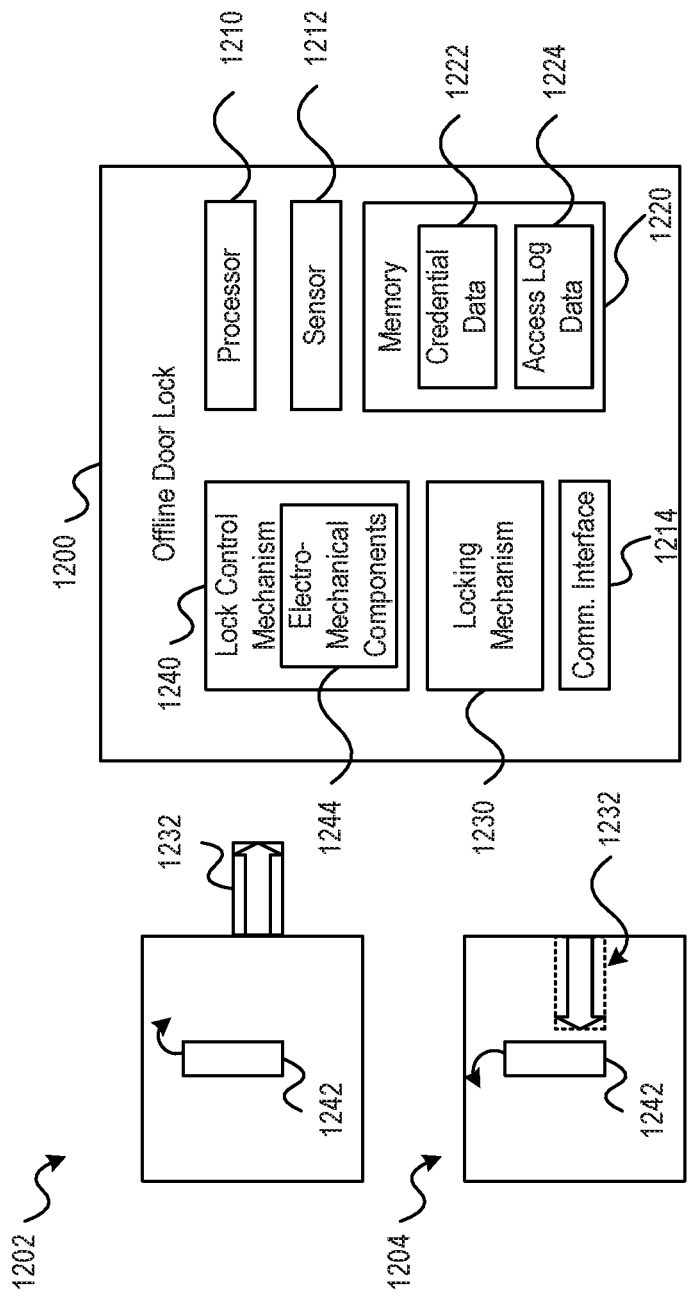
FIG. 12 is a block diagram illustrating exemplary features of an offline door lock configured in accordance with embodiments of the present disclosure.

Referring to FIG. 12, a block diagram illustrating exemplary features of an offline door lock configured in accordance with embodiments of the present disclosure is shown as an offline door lock 1200. As shown in FIG. 12, the offline door lock 1200 may include a processor 1210, a sensor 1212, a communication interface 1214, a memory 1220, a locking mechanism 1230, and a lock control mechanism 1240. The sensor 1212 may be configured to receive access credential information from a credential device placed in proximity to the sensor 1212. For example, the sensor 1212 may be configured to utilize near field communication (NFC) or Bluetooth communication to receive access credentials from an credential device (e.g., a resident's smartphone, a fob, a smartcard, and the like). Communication interface 1214 may be configured to communicatively couple the offline door lock 1200 to smart hub 110 via a non-LoRaWAN communication link, such as a Bluetooth communication link, for example. In an embodiment, the sensor 1212 may be omitted and the communication interface 1214 may be configured to utilize one or more non-LoRa-based communication links, such as a Bluetooth communication link, a ZigBee communication link, and/or other types of non-LoRa communication links, to communicate with a smart thermostat hub and/or to receive, disable, or otherwise manage access credentials, as described herein.

In an embodiment, communication interface 1214 may include one or more LoRa-based communication interfaces configured to communicatively couple the offline door lock 1200 directly to a remote system, such as a property management platform configured in accordance with embodiments of the present disclosure. In such an embodiment, rather than communicating with a smart hub to perform various operations with respect to the offline door lock 1200, as described above, the property management platform, which may be provided via server 130 of FIG. 1, may communicate control information directly to offline door lock 1200 via a LoRa-gateway (e.g., LoRa-gateway 136 of FIG. 1), such as to retrieve at least a portion of the log information maintained by offline door lock 1200, manage access credentials associated with offline door lock 1200, or other operations described herein. Because offline door lock 1200 includes, at least in the embodiment described in this example, a LoRa-based communication interface, offline door lock 1200 may be able to bi-directionally communicate with the property management platform, such as to transmit a requested portion of the access log information to the property management platform via a LoRa-gateway using LoRa-based communication links, as described above.

As shown in FIG. 12, memory 1220 of the offline door lock 1200 may store access credential validation information 1222 and access log data 1224. Additional aspects of access credential validation information 1222 and the access log data are described in more detail above with reference to FIGS. 1-6. As described above, the lock processor 1210 may be configured to determine a validity of access credential information presented to the sensor 1212 (or the communication interface 1214) based on the access credential validation information 1222. Additionally, the lock processor 1210 may be configured to selectively engage the lock control mechanism 1240 based on whether access credential is valid.

In an embodiment, the locking mechanism 1230 comprises a deadbolt 1232 and the lock control mechanism 1240 may comprise a rotatable member 1242. The locking mechanism 1230 may be configurable to change between the locked state and the unlocked state via rotation of the rotatable member. For example, in response to successful authentication of access credentials presented to the sensor 1212 (e.g., the presented access credential information is determined to be valid), the lock processor 1210 may engage the lock control mechanism 1240, and the engagement of the lock control mechanism 1240 may facilitate interaction between the lock control mechanism 1240 and the locking mechanism 1230. For example, engagement of the lock control mechanism 1240 may configure the rotatable member 1242 such that rotation of the rotatable member 1242 in a first direction drives the deadbolt 1232 to a first position corresponding to the locked state, as shown at 1202, and rotation of the rotatable member 1242 in a second direction drives the deadbolt 1232 to a second position corresponding to the unlocked state, as sown at 1204. The lock processor 1210 may be configured to ignore invalid or disabled credentials. In such instances, interaction between the lock control mechanism 1240 and the locking mechanism 1230 may be prohibited. For example, when an invalid or disabled credential is presented, the lock control mechanism 1240 may not be engaged by the lock processor 1210 in response to receipt of an invalid access credential and the locking mechanism 1230 may be maintained in a current state (e.g., either the locked state or the unlocked state). In such instances, the rotatable member 1242 may freely rotate without impacting the locking mechanism 1232. As another example, rotation of the rotatable member 1242 may be prevented, thereby causing the lock control mechanism to maintain a current state (e.g., either the locked state or the unlocked state). Thus, in the absence of engagement of the locking mechanism 1240, the locking mechanism 1230 may remain in the locked state or the unlocked state (e.g., until a valid credential is presented).

In an embodiment, the lock control mechanism 1240 may include one or more electro-mechanical components 1244, such as one or more circuits, motors, actuators, gears, or other components, configured to electrically, mechanically, or electro-mechanically configure the locking mechanism 1230 to change between the locked state and the unlocked state. For example, in response presentation of a valid access credential, the one or more electro-mechanical components 1244 may be activated to automatically drive the deadbolt 1232 to the first position or the second position. In response to presentation of an invalid access credential, the one or more electro-mechanical components may be configured to maintain the locking mechanism 1230 in a current state (e.g., the deadbolt 1232 may be maintained at the first position or the second position). In embodiments comprising an offline door lock 1200 that includes electro-mechanical components 1244, the offline door lock 1200 may further include a power supply, such as a battery or other power source, configured to supply operational power to the electro-mechanical components 1244.

In addition to controlling the electro-mechanical components 1244 in response to valid access credentials, in an embodiment, the lock processor 1210 may be configured to activate or otherwise control the electro-mechanical components 1244 to configure the locking mechanism 1230 to change between the locked state and the unlocked state in response to commands received via a non-LoRa-based communication link, such as commands received from a smart hub configured in accordance with embodiments of the present disclosure. As described above, the smart hub may be configured to generate such commands (e.g., lock commands and/or unlock commands) responsive to control information provided by a property management platform (e.g., the system 100 of FIG. 1) via a LoRa-based communication link (e.g., via server 130 and LoRa-gateway 136 of FIG. 1). Additionally, the control information received at the smart hub may be generated by the property management platform in response to information received via a user interface, such as the user interface described above that allows a resident (or property management personnel) to verify a status of the offline door lock as locked or unlocked. For example, if a status check indicates the offline door lock is unlocked, a request may be initiated from the user interface to property management platform to lock the offline door lock. In response to such a request, control information identifying the offline door lock and including an instruction to configure the offline door lock to the locked state may be communicated to the appropriate smart hub via the LoRa-based communication link and then the commands may be provided from the smart hub to the offline door lock via a non-LoRa-based communication link, such as a Bluetooth low energy (BLE) communication link, a ZigBee communication link, a Zwave communication link, etc.

In an embodiment, the offline door lock 1200 may not be configured to facilitate the use of remote unlock commands irrespective of whether the offline door lock 1200 includes the electro-mechanical components 1244. For example, although access credentials may be disabled or enabled/provided via commands received from a smart hub in response to control information transmitted to the smart hub by a property management platform, the offline door lock 1200 may be prevented from enabling the locking mechanism to change between the locked state and the unlocked state via commands received from the smart hub. In this example, the offline door lock 1200 may only enable the locking mechanism to change between the locked state and the unlocked state when a valid access credential is received (e.g., via the sensor 1212 or the communication interface 1214) from a user device (e.g., smartphone, etc.) or third party device (e.g., a fob, a smartcard, etc.).

Figure 13:
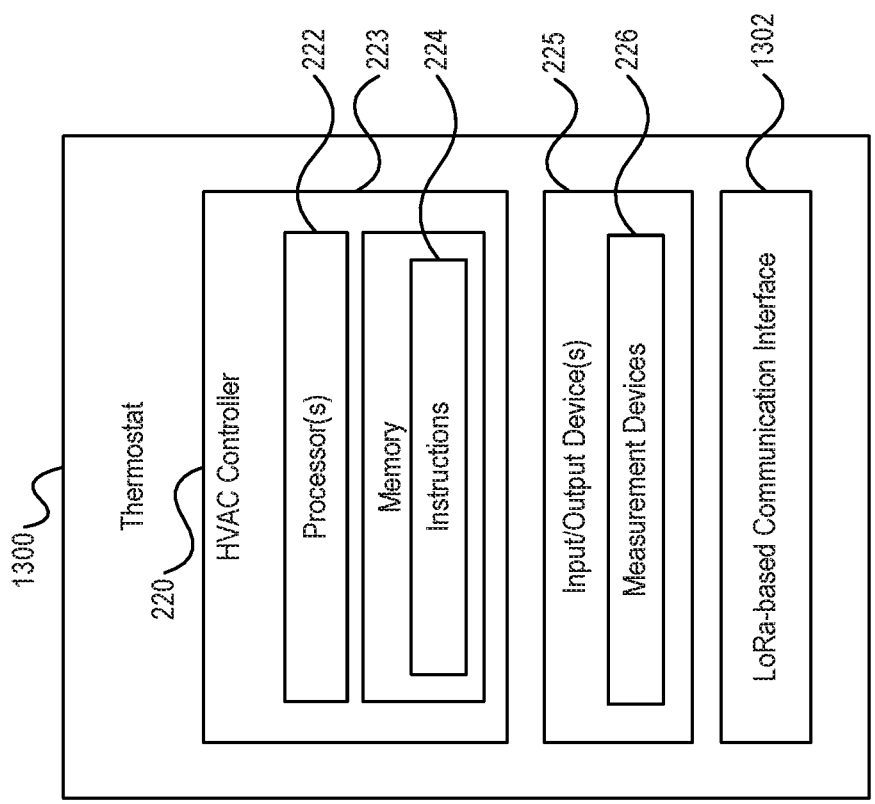
FIG. 13 is a block diagram illustrating an embodiment of a smart thermostat in accordance with embodiments of the present disclosure.

Referring to FIG. 13, a block diagram illustrating an embodiment of a smart thermostat in accordance with embodiments of the present disclosure is shown as a smart thermostat 1300. As shown in FIG. 13, the smart thermostat 1300 may include the components illustrated with respect to the thermostat component 410 of FIG. 4, however, rather than including the smart hub interface 412, the smart thermostat 1300 may include a LoRa-based communication interface. In such an embodiment, the smart thermostat 1300 may be communicatively coupled to a property management platform (e.g., the system 100 of FIG. 1) via a LoRa-based communication link, and may receive control information from the property management platform directly, as opposed to receiving commands derived from control information by a smart hub. Such a direct communication link may enable operational aspects of the smart thermostat 1300 to be configured, such as temperature settings, operating modes, and the like as described above, to be configured via control information provided by the property management platform (e.g., via server 130 and gateway 136 of FIG. 1) without requiring a smart hub to be provided in proximity to or in connection with the smart thermostat 1300. In this manner, the advantages provided by utilizing a smart hub to control a thermostat, such as to place the thermostat into vacant mode or other advantageous operations, may be provided by the smart thermostat 1300 directly, thereby providing a more cost effective solution for situations where the additional functionality provided by the smart hub (e.g., short-range communication with offline door locks and other smart devices) may not be desired or practical.

Although the embodiments of the present disclosure and their advantages have been described in detail, it should be understood that various changes, substitutions and alterations can be made herein without departing from the spirit and scope of the disclosure as defined by the appended claims. It should be noted that although the descriptions provided above with respect to FIGS. 1-13 have been described with reference to multi-family residential properties, embodiments of the present disclosure may be readily applied to other types of properties, such as commercial properties (e.g., office spaces, warehouses, storage units, malls, and the like). Accordingly, it is to be understood that embodiments of the present disclosure are not limited to use with multi-family residential properties. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A system for controlling and securing a plurality of smart devices within a unit of a multi-family residential or commercial property, the system comprising:
   a smart hub comprising:
      one or more processors;
      a memory communicatively coupled to the one or more processors;
      a first communication interface configured to communicatively couple the one or more processors to a Long Range (LoRa) wide area network (LoRaWAN) communication link; and
      a second communication interface configured to communicatively couple the one or more processors to the plurality of smart devices and to a user device associated with an occupant of the unit via a non-LoRaWAN communication link;
   where the one or more processors are configured to:
      receive control information via the LoRaWAN communication link from a property management platform for the multi-family residential or commercial property, the control information including a request for a status check associated with an electronic door lock,
      identify at least one smart device of the plurality of smart devices based on the control information, the at least one smart device including the electronic door lock,
      transmit a command derived from the control information to the at least one smart device via the non-LoRaWAN communication link,
      receive status information from the electronic door lock via the non-LoRaWAN communication link based on transmission of the command, and
      transmit the status information to the property management platform for the multi-family residential or commercial property via the LoRaWAN communication link.

2. The system of claim 1 where electronic door lock comprises an offline door lock and the command is further configured to disable at least one access credential stored at a memory of the offline door lock.

3. The system of claim 1 where:
   the one or more processors are configured to derive a second command from the control information, the second command to be transmitted to a second smart device of the at least one smart device via the non-LoRaWAN communication link,
   the second smart device comprises a thermostat and the second command is configured to adjust a temperature setting of the thermostat, or
   the second smart device comprises a smart light fixture and the second command is configured to turn off or turn on the smart light fixture.

4. The system of claim 1 where the one or more processors, the first communication interface, the second communication interface, and the memory are integrated within a housing of a thermostat.

5. The system of claim 1 where the smart hub is coupled to electrical wiring at the multi-family residential or commercial property.

6. The system of claim 1 where the smart hub is located within the unit of the multi-family residential or commercial property.

7. The system of claim 1 where:
the non-LoRaWAN communication link comprises at least one of a Wireless Fidelity (Wi-Fi) communication link, a ZigBee communication link, and a Bluetooth communication link,
the second communication interface is configured to directly couple the one or more processors to the plurality of smart devices via the non-LoRaWAN communication link, and
communicatively coupling the one or more processors to the user device enables user interaction with the smart hub.

8. The system of claim 1 where the one or more processors are further configured to:
retrieve at least a portion of access log information from the electronic door lock via the non-LoRaWAN communication link; and
transmit the at least a portion of access log information to the property management platform for the multi-family residential or commercial property via the LoRaWAN communication link.

9. The system of claim 8 where the one or more processors are further configured to periodically transmit requests for the access log information to the electronic door lock via the non-LoRaWAN communication link.

10. The system of claim 8 where the control information received from the property management platform for the multi-family residential or commercial property includes a request for the access log information, and where the at least a portion of access log information is retrieved based on receipt of the request for the access log information.

11. A method for controlling and securing a plurality of smart devices within a unit of a multi-family residential or commercial property, the method comprising:
receiving, by one or more processors of a smart hub, control information via a Long Range (LoRa) wide area network (LoRaWAN) communication link from a property management platform for the multi-family residential or commercial property, the control information including a request for a status check associated with an electronic door lock;
identifying, by the one or more processors, a smart device of the plurality of smart devices based on the control information, the smart device including the electronic door lock;
transmitting, by the one or more processors, a command derived from the control information to the smart device via a non-LoRaWAN communication link, the smart hub configured to be communicatively coupled to a user device associated with an occupant of the unit via the non-LoRaWAN communication link;
receiving, by the one or more processors, status information from the electronic door lock via the non-LoRaWAN communication link based on transmission of the command; and
transmitting, by the one or more processors, the status information to the property management platform for the multi-family residential or commercial property via the LoRaWAN communication link.

12. The method of claim 11 where the electronic door lock comprises an offline door lock and the command is further configured to disable at least one access credential stored at a memory of the offline door lock.

13. The method of claim 11 further comprising transmitting a second command derived from the control information to a second smart device of the plurality of smart devices via the non-LoRaWAN communication link, where the second smart device comprises a thermostat and the second command is configured to adjust a temperature setting of the thermostat.

14. The method of claim 11 further comprising transmitting a second command derived from the control information to a second smart device of the plurality of smart devices via the non-LoRaWAN communication link, where the second smart device comprises a smart light fixture and the second command is configured to turn off or turn on the smart light fixture.

15. The method of claim 11 where the smart hub is located within a public area of the multi-family residential or commercial property.

16. The method of claim 11 further comprising:
transmitting a request to the smart device via the non-LoRaWAN communication link;
receiving data from the smart device via the non-LoRaWAN communication link subsequent to transmission of the request; and
transmitting at least a portion of the data to the property management platform for the multi-family residential or commercial property via the LoRaWAN communication link.

17. A non-transitory computer-readable storage medium storing instructions that, when executed by one or more processors of a smart hub, cause the one or more processors to perform operations for controlling and securing a plurality of smart devices within a unit of a multi-family residential or commercial property, the operations comprising:
receiving control information via a Long Range (LoRa) wide area network (LoRaWAN) communication link from a property management platform for the multi-family residential or commercial property, the control information including a request for a status check associated with an electronic door lock;
identifying a smart device of the plurality of smart devices based on the control information, the smart device including the electronic door lock;
transmitting a command derived from the control information to the smart device via a non-LoRaWAN communication link, the smart hub configured to be communicatively coupled to a user device associated with an occupant of the unit via the non-LoRaWAN communication link;
receiving status information from the electronic door lock via the non-LoRaWAN communication link based on transmission of the command; and
transmitting the status information to the property management platform for the multi-family residential or commercial property via the LoRaWAN communication link.

18. The non-transitory computer-readable storage medium of claim 17 where the smart device comprises an offline door lock configurable to change between a locked state or an unlocked state via access credentials stored at a memory of the offline door lock, where the command is configured to disable at least one access credential stored at the memory of the offline door lock, and where the offline door lock comprises a lock processor configured to receive an access credential from a credential device and to determine validity of the received access credential based on the access credentials stored at the memory of the offline door lock.

19. The non-transitory computer-readable storage medium of claim 17 where the operations further comprise:
   identifying an action indicated by the control information, the action to be performed at the smart device; and
   deriving the command based on the action, where the command is executable by the smart device to cause performance of the action.

20. The non-transitory computer-readable storage medium of claim 17 where the non-LoRaWAN communication link comprises a Bluetooth low energy (BLE) communication link.

* * * * *

UNITED STATES PATENT AND TRADEMARK OFFICE
CERTIFICATE OF CORRECTION

PATENT NO. : 11,189,118 B2
APPLICATION NO. : 16/912370
DATED : November 30, 2021
INVENTOR(S) : Dave Marcinkowski et al.

It is certified that error appears in the above-identified patent and that said Letters Patent is hereby corrected as shown below:

In the Claims

At Column 28, Claim number 2, Line number 45, delete "where electronic door lock" and replace with --where the electronic door lock--.

Signed and Sealed this
Twenty-fifth Day of January, 2022

Drew Hirshfeld
*Performing the Functions and Duties of the
Under Secretary of Commerce for Intellectual Property and
Director of the United States Patent and Trademark Office*